United States Patent
Ma et al.

(10) Patent No.: US 9,024,925 B2
(45) Date of Patent: May 5, 2015

(54) COLOR PERFORMANCE OF IMODS

(71) Applicant: QUALCOMM MEMS Technologies, Inc., San Diego, CA (US)

(72) Inventors: Jian J. Ma, Carlsbad, CA (US); John Hyunchul Hong, San Clemente, CA (US); Tallis Young Chang, San Diego, CA (US); Huanzhao Zeng, Vancouver, WA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 161 days.

(21) Appl. No.: 13/801,134

(22) Filed: Mar. 13, 2013

(65) Prior Publication Data

US 2014/0267197 A1    Sep. 18, 2014

(51) Int. Cl.
| | |
|---|---|
| *G06F 3/038* | (2013.01) |
| *G02B 26/00* | (2006.01) |
| *G09G 3/20* | (2006.01) |
| *G09G 3/34* | (2006.01) |

(52) U.S. Cl.
CPC ............ *G02B 26/001* (2013.01); *G09G 3/2003* (2013.01); *G09G 3/3466* (2013.01); *G09G 2310/0278* (2013.01)

(58) Field of Classification Search
None
See application file for complete search history.

(56) References Cited

U.S. PATENT DOCUMENTS

| | | | |
|---|---|---|---|
| 7,036,942 B2 | 5/2006 | Ogawa | |
| 7,527,996 B2 | 5/2009 | Luo et al. | |
| 7,711,239 B2 | 5/2010 | Sasagawa et al. | |
| 7,715,079 B2 | 5/2010 | Kogut et al. | |
| 7,742,220 B2 | 6/2010 | Kogut et al. | |
| 7,884,989 B2 | 2/2011 | Gally et al. | |
| 8,027,077 B2 | 9/2011 | Border | |
| 8,031,133 B2 | 10/2011 | Gally et al. | |
| 8,111,262 B2 | 2/2012 | Djordjev et al. | |
| 2007/0249078 A1 | 10/2007 | Tung et al. | |
| 2009/0244686 A1 | 10/2009 | Djordjev | |
| 2011/0026095 A1* | 2/2011 | Kothari et al. | 359/290 |
| 2011/0286072 A1 | 11/2011 | Liu et al. | |
| 2012/0182595 A1* | 7/2012 | Miles | 359/290 |
| 2013/0162656 A1* | 6/2013 | Holman et al. | 345/501 |
| 2014/0092110 A1* | 4/2014 | Chan et al. | 345/530 |

FOREIGN PATENT DOCUMENTS

| | | |
|---|---|---|
| DE | 102006013939 | 9/2007 |
| DE | 102009021936 | 11/2010 |

OTHER PUBLICATIONS

International Search Report and Written Opinion—PCT/US2014/017103—ISA/EPO—Aug. 4, 2014.
Partial International Search Report—PCT/US2014/017103—ISA/EPO—May 27, 2014.
Taiwan Search Report in Application No. TW103107766, dated Feb. 5, 2015.

* cited by examiner

*Primary Examiner* — Muhammad N Edun
(74) *Attorney, Agent, or Firm* — Weaver Austin Villeneuve & Sampson

(57) ABSTRACT

This disclosure provides systems, methods and apparatus, including computer programs encoded on computer storage media, for making and controlling single-mirror interferometric modulators (IMODs), which may be multi-state IMODs or analog IMODs. In one aspect, a movable reflector stack or an absorber stack of an IMOD may include at least one protrusion that is configured to cause the movable reflector stack to be tilted relative to the absorber layer when the movable reflector stack is moved close to the absorber stack. The protrusion may be configured to cause color averaging when the IMOD is in a white state. The absorber stack may include an absorber layer having a lower extinction coefficient value at a red wavelength and a higher extinction coefficient value at a blue wavelength.

35 Claims, 13 Drawing Sheets

RED

GREEN

BLUE

BLACK

WHITE

COLOR PERFORMANCE OF IMODS

TECHNICAL FIELD

This disclosure relates to electromechanical systems and devices, and more particularly to electromechanical systems for implementing reflective display devices.

DESCRIPTION OF THE RELATED TECHNOLOGY

Electromechanical systems (EMS) include devices having electrical and mechanical elements, actuators, transducers, sensors, optical components such as mirrors and optical films, and electronics. EMS devices or elements can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of EMS device is called an interferometric modulator (IMOD). The term IMOD or interferometric light modulator refers to a device that selectively absorbs and/or reflects light using the principles of optical interferometric absorption. In some implementations, an IMOD display element may include a pair of conductive plates, one of which has a high reflectance and one is partially absorptive. The pair of conductive plates are capable of relative motion upon application of an appropriate electrical signal. For example, one plate may include a stationary layer deposited over, on or supported by a substrate and the other plate may include a partial absorptive membrane separated from the stationary layer by an air gap. The position of one plate in relation to another can change the spectrum of the reflected light from the IMOD display element. IMOD-based display devices have a wide range of applications, and are anticipated to be used in improving existing products and creating new products, especially those with display capabilities.

Some IMODs are bi-stable IMODs, meaning that they can be configured in only two positions, high reflectance and low reflectance. At the high reflectance position, each pixel in a bi-stable IMOD reflects only one of the RGB primary colors. In some implementations, a display including such bi-stable IMODs may incorporate three sub-pixels to display an image pixel. In a display device that includes multi-state interferometric modulators (MS-IMODs) or analog IMODs (A-IMODs), each pixel can have more than two positions (or gap spacings), and a pixel's reflective color may be determined by the gap spacing or "gap height" between an absorber stack and a reflector stack of a single IMOD. As such, each pixel can reflect multiple colors. Some A-IMODs may be positioned in a substantially continuous manner between a large number of gap heights, whereas MS-IMODs may generally be positioned in a smaller number of gap heights.

SUMMARY

The systems, methods and devices of this disclosure each have several innovative aspects, no single one of which is solely responsible for the desirable attributes disclosed herein.

One innovative aspect of the subject matter described in this disclosure can be implemented in an interferometric modulator (IMOD). The IMOD may include a substrate, an absorber stack disposed on the substrate and a movable reflector stack including a metal mirror and a dielectric stack. The dielectric stack may be disposed between the absorber stack and the metal mirror. The dielectric stack may be configured to reduce a standing wave node separation for light reflecting from the movable reflector stack, as compared to light reflecting from the movable reflector stack in the absence of the dielectric stack, such that the IMOD is configured for reflecting a white color when the reflector stack is in close proximity to the absorber stack.

The movable reflector stack may be further configured to be moved between a number of positions relative to the absorber stack. Each of the positions may correspond with an IMOD color state including a white state for reflecting the white color, a black state, and one or more other colored states.

The IMOD may include a first protrusion connected to the movable reflector stack or to the absorber stack. The first protrusion may have a first height and may be configured to cause the movable reflector stack to be tilted relative to the absorber stack when the movable reflector stack is moved close to the absorber stack. In some implementations, the first protrusion may be configured to cause the movable reflector stack to be tilted by less than one degree relative to the absorber stack when the movable reflector stack is moved close to the absorber stack. The first protrusion may be configured to cause color averaging when the moveable reflector stack is tilted and/or when the IMOD is in a white state. The first protrusion may be connected to a surface of the movable reflector stack facing the absorber layer.

The IMOD may include at least a second protrusion. The second protrusion may have a second height that is different from the first height. In some implementations, the IMOD may include a plurality of additional protrusions. The additional protrusions may have varying heights, at least some of which may be different from the first height.

In some implementations, the dielectric stack may include a high-index layer and a low-index layer. The low-index layer may have a lower chromatic dispersion than that of the high-index layer. For example, the low-index layer may be formed, at least in part, of SiON or $SiO_2$ and the high-index layer may be formed, at least in part, of $TiO_2$, $ZrO_2$ or $Nb_2O_5$.

A display device may include the IMOD. The display device may include a control system configured to control the display device. The control system may be configured to process image data. The control system may include a driver circuit configured to send at least one signal to a display of the display device and a controller configured to send at least a portion of the image data to the driver circuit. The control system may include an image source module configured to send the image data to the processor. The image source module may include at least one of a receiver, transceiver, and transmitter. The display device may include an input device configured to receive input data and to communicate the input data to the control system.

Another innovative aspect of the subject matter described in this disclosure can be implemented in a method that involves controlling an IMOD. The method may involve receiving an applied voltage differential between a moveable reflector stack and an absorber stack, moving the movable reflector stack to a position proximate the absorber stack in response to the applied voltage differential and tilting the movable reflector stack by less than one degree relative to the absorber stack by causing a first protrusion disposed on the movable reflector stack or the absorber stack to come in contact with the other stack.

In some implementations, the first protrusion has a first height. The tilting process may involve causing a second protrusion to make contact with the movable reflector stack or the absorber stack. The second protrusion may have a second height. The tilting process may involve causing a plurality of additional protrusions to make contact with the movable reflector stack or the absorber stack. The plurality of additional protrusions may have varying heights that may be different from the first height. The tilting process may cause color averaging when the IMOD is in a white state.

Another innovative aspect of the subject matter described in this disclosure can be implemented in an IMOD that includes a substrate and an absorber stack disposed on the substrate. The absorber stack may include an absorber layer. The absorber layer may include a material that has a red extinction coefficient value at a red wavelength and a blue extinction coefficient value at a blue wavelength. The blue extinction coefficient value may be a higher value than the red extinction coefficient value.

The IMOD also may include a movable reflector stack configured to be moved between a number of positions relative to the absorber stack. Each of the positions may correspond with an IMOD color state including a white state for reflecting the white color, a black state, and one or more colored states. The IMOD may be configured to reflect a white color when the moveable reflector stack is in close proximity to the absorber stack. The movable reflector stack may include a metal mirror and a dielectric stack disposed between the absorber stack and the metal mirror.

The absorber stack may include an impedance-matching layer. In some implementations, the impedance-matching layer may include a pair of high dispersion and low dispersion layers. The low dispersion layer may include $SiO_2$ and/or SiON. The high dispersion material may include TiO2 or $Si_3N_4$. The absorber layer may be formed, at least in part, of vanadium, germanium and/or osmium.

The IMOD may include a first protrusion connected to the movable reflector stack or to the absorber stack. The first protrusion may have a first height and may be configured to cause the movable reflector stack to be tilted relative to the absorber layer when the movable reflector stack is moved close to the absorber stack. For example, the first protrusion may be configured to cause the movable reflector stack to be tilted by less than one degree relative to the absorber stack when the movable reflector stack is moved close to the absorber stack. The first protrusion may be configured to cause color averaging when the moveable reflector stack is tilted. The first protrusion may be configured to cause color averaging when the IMOD is in a white state. In some implementations, the first protrusion may be connected to a surface of the movable reflector stack facing the absorber layer.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
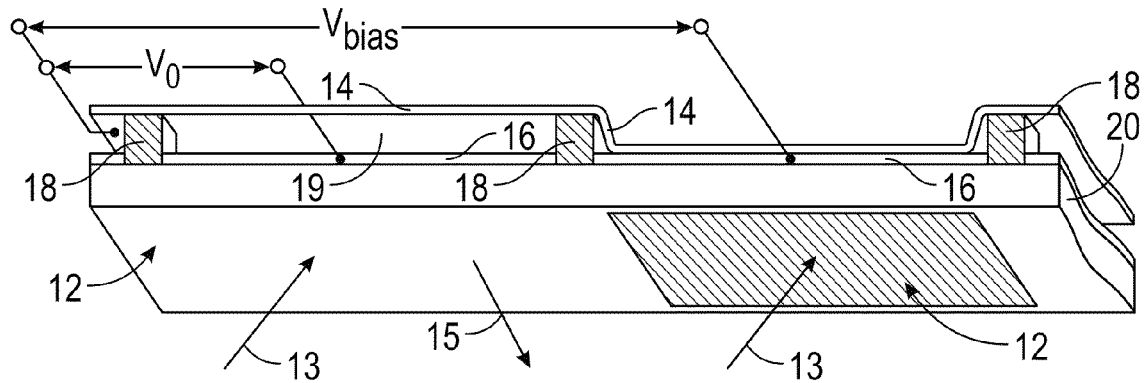
FIG. 1 is an isometric view illustration depicting two adjacent interferometric modulator (IMOD) display elements in a series or array of display elements of an IMOD display device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Various implementations described herein involve tilting an IMOD when it is in a white state. Without being bound to any theory, it is believed that such a tilt can cause color averaging. The IMOD may include a movable reflector stack or absorber stack that has at least one protrusion configured to cause the movable reflector stack to be tilted relative to the absorber layer when the movable reflector stack is moved close to the absorber stack. In some implementations, the absorber stack may include an absorber layer having a lower extinction coefficient value at a red wavelength and a higher extinction coefficient value at a blue wavelength. The absorber stack also may include an impedance-matching layer.

Particular implementations of the subject matter described in this disclosure can be implemented to realize one or more of the following potential advantages. Tilting an IMOD when the IMOD is in a white state can produce a white state that is less greenish than that of the same IMOD thin film stack without tilting. This can allow a single IMOD to be a multi-state IMOD (or an analog IMOD) capable of reflecting more than two colors, for example, eight or another number of colors, including the color white. As compared to spatial dithering techniques that involve mixing a tinted white with other colors to synthesize a more neutral white, tilting the IMOD to produce a white state may increase display brightness and less spatial dithering noise while using less processing overhead and less electric power. Including an absorber layer in the absorber stack that has a lower extinction coefficient value at a red wavelength and a higher extinction coefficient value at a blue wavelength can produce a relatively more saturated red color when the IMOD is in a red state.

An example of a suitable EMS or MEMS device or apparatus, to which the described implementations may apply, is a reflective display device. Reflective display devices can incorporate interferometric modulator (IMOD) display elements that can be implemented to selectively absorb and/or reflect light incident thereon using principles of optical interference. IMOD display elements can include a partial optical absorber, a reflector that is movable with respect to the absorber, and an optical resonant cavity defined between the absorber and the reflector. In some implementations, the reflector can be moved to two or more different positions, which can change the size of the optical resonant cavity and thereby affect the reflectance of the IMOD. The reflectance spectra of IMOD display elements can create fairly broad spectral bands that can be shifted across the visible wavelengths to generate different colors. The position of the spectral band can be adjusted by changing the thickness of the optical resonant cavity. One way of changing the optical resonant cavity is by changing the position of the reflector with respect to the absorber.

FIG. 1 is an isometric view illustration depicting two adjacent interferometric modulator (IMOD) display elements in a series or array of display elements of an IMOD display device. The IMOD display device includes one or more interferometric EMS, such as MEMS, display elements. In these devices, the interferometric MEMS display elements can be configured in either a bright or dark state. In the bright ("relaxed," "open" or "on," etc.) state, the display element reflects a large portion of incident visible light. Conversely, in the dark ("actuated," "closed" or "off," etc.) state, the display element reflects little incident visible light. MEMS display elements can be configured to reflect predominantly at particular wavelengths of light allowing for a color display in addition to black and white. In some implementations, by using multiple display elements, different intensities of color primaries and shades of gray can be achieved.

The IMOD display device can include an array of IMOD display elements which may be arranged in rows and columns. Each display element in the array can include at least a pair of reflective and semi-reflective layers, such as a movable reflective layer (i.e., a movable layer, also referred to as a mechanical layer) and a fixed partially reflective layer (i.e., a stationary layer), positioned at a variable and controllable distance from each other to form an air gap (also referred to as an optical gap, cavity or optical resonant cavity). The movable reflective layer may be moved between at least two positions. For example, in a first position, i.e., a relaxed position, the movable reflective layer can be positioned at a distance from the fixed partially reflective layer. In a second position, i.e., an actuated position, the movable reflective layer can be positioned more closely to the partially reflective layer. Incident light that reflects from the two layers can interfere constructively and/or destructively depending on the position of the movable reflective layer and the wavelength(s) of the incident light, producing either an overall reflective or non-reflective state for each display element. In some implementations, the display element may be in a reflective state when unactuated, reflecting light within the visible spectrum, and may be in a dark state when actuated, absorbing and/or destructively interfering light within the visible range. In some other implementations, however, an IMOD display element may be in a dark state when unactuated, and in a reflective state when actuated. In some implementations, the introduction of an applied voltage can drive the display elements to change states. In some other implementations, an applied charge can drive the display elements to change states.

The depicted portion of the array in FIG. 1 includes two adjacent interferometric MEMS display elements in the form of IMOD display elements 12. In the display element 12 on the right (as illustrated), the movable reflective layer 14 is illustrated in an actuated position near, adjacent or touching the optical stack 16. The voltage $V_{bias}$ applied across the display element 12 on the right is sufficient to move and also maintain the movable reflective layer 14 in the actuated position. In the display element 12 on the left (as illustrated), a movable reflective layer 14 is illustrated in a relaxed position at a distance (which may be predetermined based on design parameters) from an optical stack 16, which includes a partially reflective layer. The voltage $V_o$ applied across the display element 12 on the left is insufficient to cause actuation of the movable reflective layer 14 to an actuated position such as that of the display element 12 on the right.

In FIG. 1, the reflective properties of IMOD display elements 12 are generally illustrated with arrows indicating light 13 incident upon the IMOD display elements 12, and light 15 reflecting from the display element 12 on the left. Most of the light 13 incident upon the display elements 12 may be transmitted through the transparent substrate 20, toward the optical stack 16. A portion of the light incident upon the optical stack 16 may be transmitted through the partially reflective layer of the optical stack 16, and a portion will be reflected back through the transparent substrate 20. The portion of light 13 that is transmitted through the optical stack 16 may be reflected from the movable reflective layer 14, back toward (and through) the transparent substrate 20. Interference (constructive and/or destructive) between the light reflected from the partially reflective layer of the optical stack 16 and the light reflected from the movable reflective layer 14 will determine in part the intensity of wavelength(s) of light 15 reflected from the display element 12 on the viewing or substrate side of the device. In some implementations, the transparent substrate 20 can be a glass substrate (sometimes referred to as a glass plate or panel). The glass substrate may be or include, for example, a borosilicate glass, a soda lime glass, quartz, Pyrex, or other suitable glass material. In some implementations, the glass substrate may have a thickness of 0.3, 0.5 or 0.7 millimeters, although in some implementations the glass substrate can be thicker (such as tens of millimeters) or thinner (such as less than 0.3 millimeters). In some implementations, a non-glass substrate can be used, such as a polycarbonate, acrylic, polyethylene terephthalate (PET) or polyether ether ketone (PEEK) substrate. In such an implementation, the non-glass substrate will likely have a thickness of less than 0.7 millimeters, although the substrate may be thicker depending on the design considerations. In some implementations, a non-transparent substrate, such as a metal foil or stainless steel-based substrate can be used. For example, a reverse-IMOD-based display, which includes a fixed reflective layer and a movable layer which is partially transmissive and partially reflective, may be configured to be viewed from the opposite side of a substrate as the display elements 12 of FIG. 1 and may be supported by a non-transparent substrate.

The optical stack 16 can include a single layer or several layers. The layer(s) can include one or more of an electrode layer, a partially reflective and partially transmissive layer, and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals (e.g., chromium and/or molybdenum), semiconductors, and dielectrics. The partially reflective layer can be formed of one or more layers of materials, and each of the layers can be formed of a single material or a combination of materials. In some implementations, certain portions of the optical stack 16 can include a single semi-transparent thickness of metal or semiconductor which serves as both a partial optical absorber and electrical conductor, while different, electrically more conductive layers or portions (e.g., of the optical stack 16 or of other structures of the display element) can serve to bus signals between IMOD display elements. The optical stack 16 also can include one or more insulating or dielectric layers covering one or more conductive layers or an electrically conductive/partially absorptive layer.

In some implementations, at least some of the layer(s) of the optical stack 16 can be patterned into parallel strips, and may form row electrodes in a display device as described further below. As will be understood by one having ordinary skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of supports, such as the illustrated posts 18, and an intervening sacrificial material located between the posts 18. When the sacrificial material is etched away, a defined gap 19, or optical cavity, can be formed between the movable reflective layer 14 and the optical stack 16. In some implementations, the spacing between posts 18 may be approximately 1-1000 µm, while the gap 19 may be approximately less than 10,000 Angstroms (Å).

In some implementations, each IMOD display element, whether in the actuated or relaxed state, can be considered as a capacitor formed by the fixed and moving reflective layers. When no voltage is applied, the movable reflective layer 14 remains in a mechanically relaxed state, as illustrated by the display element 12 on the left in FIG. 1, with the gap 19 between the movable reflective layer 14 and optical stack 16. However, when a potential difference, i.e., a voltage, is applied to at least one of a selected row and column, the capacitor formed at the intersection of the row and column electrodes at the corresponding display element becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated display element 12 on the right in FIG. 1. The behavior can be the same regardless of the polarity of the applied potential difference. Though a series of display elements in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. In some implementations, the rows may be referred to as "common" lines and the columns may be referred to as "segment" lines, or vice versa. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
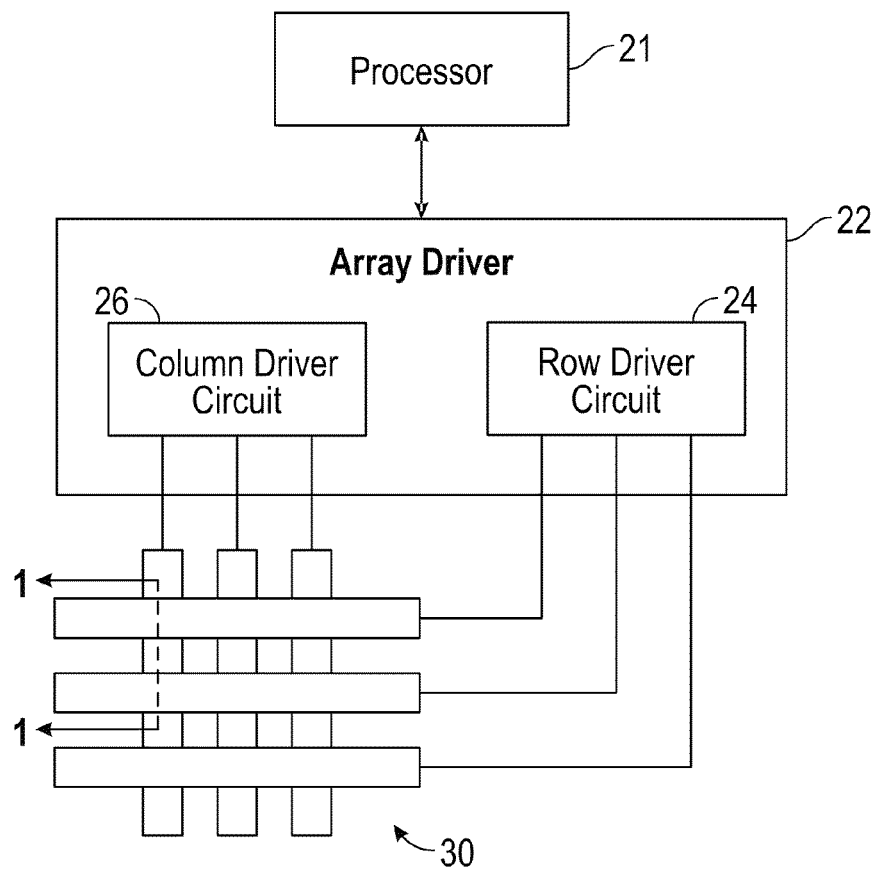
FIG. 2 is a system block diagram illustrating an electronic device incorporating an IMOD-based display including a three element by three element array of IMOD display elements.

FIG. 2 is a system block diagram illustrating an electronic device incorporating an IMOD-based display including a three element by three element array of IMOD display elements. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, for example a display array or panel 30. The cross section of the IMOD display device illustrated in FIG. 1 is shown by the lines 1-1 in FIG. 2. Although FIG. 2 illustrates a 3×3 array of IMOD display elements for the sake of clarity, the display array 30 may contain a very large number of IMOD display elements, and may have a different number of IMOD display elements in rows than in columns, and vice versa.

Figure 3:
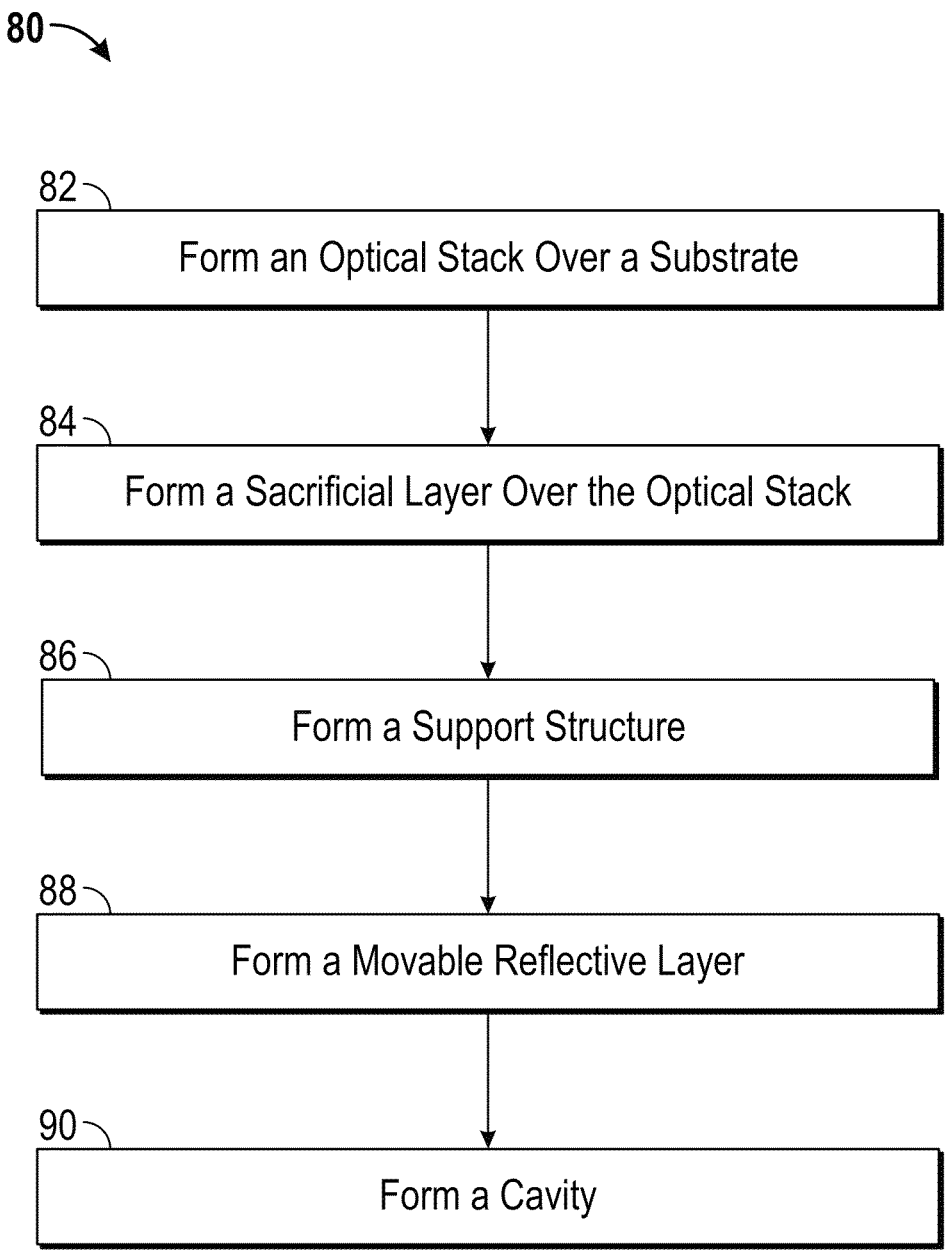
FIG. 3 is a flow diagram illustrating a manufacturing process for an IMOD display or display element.
Figure 4A:
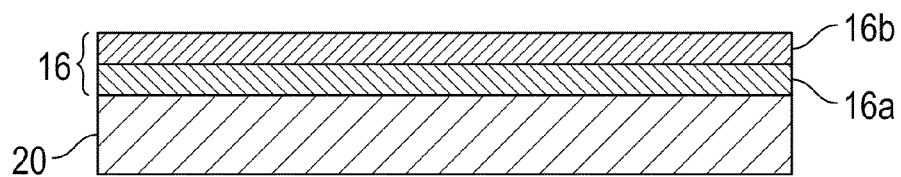
FIGS. 4A-4E are cross-sectional illustrations of various stages in a process of making an IMOD display or display element.

FIG. 3 is a flow diagram illustrating a manufacturing process 80 for an IMOD display or display element. FIGS. 4A-4E are cross-sectional illustrations of various stages in the manufacturing process 80 for making an IMOD display or display element. In some implementations, the manufacturing process 80 can be implemented to manufacture one or more EMS devices, such as IMOD displays or display elements. The manufacture of such an EMS device also can include other blocks not shown in FIG. 3. The process 80 begins at block 82 with the formation of the optical stack 16 over the substrate 20. FIG. 4A illustrates such an optical stack 16 formed over the substrate 20. The substrate 20 may be a transparent substrate such as glass or plastic such as the materials discussed above with respect to FIG. 1. The substrate 20 may be flexible or relatively stiff and unbending, and may have been subjected to prior preparation processes, such as cleaning, to facilitate efficient formation of the optical stack 16. As discussed above, the optical stack 16 can be electrically conductive, partially transparent, partially reflective, and partially absorptive, and may be fabricated, for example, by depositing one or more layers having the desired properties onto the transparent substrate 20.

In FIG. 4A, the optical stack 16 includes a multilayer structure having sub-layers 16a and 16b, although more or fewer sub-layers may be included in some other implementations. In some implementations, one of the sub-layers 16a and 16b can be configured with both optically absorptive and electrically conductive properties, such as the combined conductor/absorber sub-layer 16a. In some implementations, one of the sub-layers 16a and 16b can include molybdenum-chromium (molychrome or MoCr), or other materials with a suitable complex refractive index. Additionally, one or more of the sub-layers 16a and 16b can be patterned into parallel strips, and may form row electrodes in a display device. Such patterning can be performed by a masking and etching process or another suitable process known in the art. In some implementations, one of the sub-layers 16a and 16b can be an insulating or dielectric layer, such as an upper sub-layer 16b that is deposited over one or more underlying metal and/or oxide layers (such as one or more reflective and/or conductive layers). In addition, the optical stack 16 can be patterned into individual and parallel strips that form the rows of the display. In some implementations, at least one of the sub-layers of the optical stack, such as the optically absorptive layer, may be quite thin (e.g., relative to other layers depicted in this disclosure), even though the sub-layers 16a and 16b are shown somewhat thick in FIGS. 4A-4E.

Figure 4B:
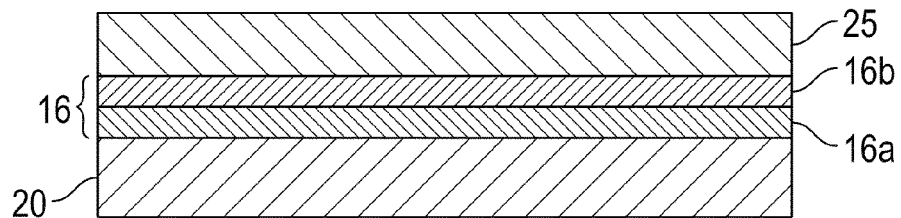

The process 80 continues at block 84 with the formation of a sacrificial layer 25 over the optical stack 16. Because the sacrificial layer 25 is later removed (see block 90) to form the cavity 19, the sacrificial layer 25 is not shown in the resulting IMOD display elements. FIG. 4B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (Si), in a thickness selected to provide, after subsequent removal, a gap or cavity 19 (see also FIG. 4E) having a desired design size. Deposition of the sacrificial material may be carried out using deposition techniques such as physical vapor deposition (PVD, which includes many different techniques, such as sputtering), plasma-enhanced chemical vapor deposition (PECVD), thermal chemical vapor deposition (thermal CVD), or spin-coating.

Figure 4C:
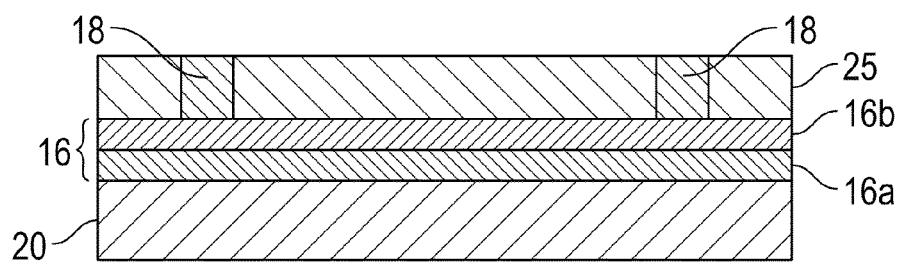
Figure 4D:
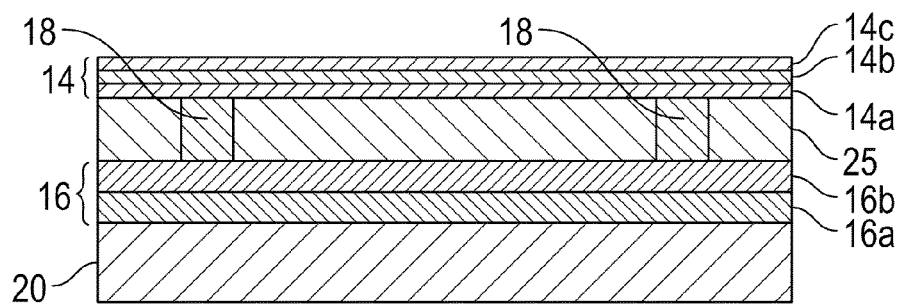
Figure 4E:
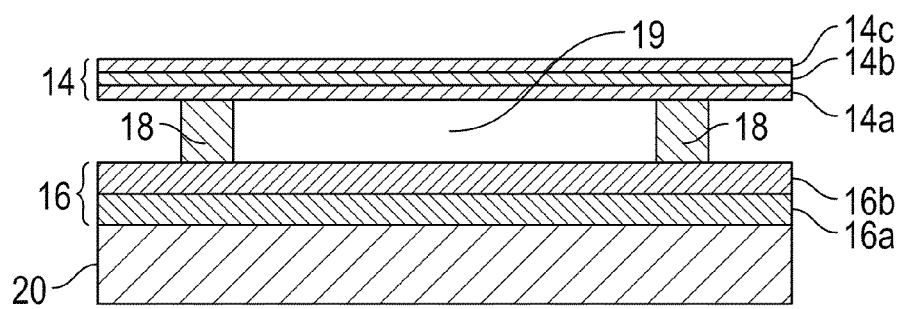

The process 80 continues at block 86 with the formation of a support structure such as a support post 18. The formation of the support post 18 may include patterning the sacrificial layer 25 to form a support structure aperture, then depositing a material (such as a polymer or an inorganic material, like silicon oxide) into the aperture to form the support post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the support post 18 contacts the substrate 20. Alternatively, as depicted in FIG. 4C, the aperture formed in the sacrificial layer 25 can extend through the sacrificial layer 25, but not through the optical stack 16. For example, FIG. 4E illustrates the lower ends of the support posts 18 in contact with an upper surface of the optical stack 16. The support post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 4C, but also can extend at least partially over a portion of the sacrificial layer 25. As noted above, the patterning of the sacrificial layer 25 and/or the support posts 18 can be performed by a masking and etching process, but also may be performed by alternative patterning methods.

The process 80 continues at block 88 with the formation of a movable reflective layer or membrane such as the movable reflective layer 14 illustrated in FIG. 44. The movable reflective layer 14 may be formed by employing one or more deposition steps, including, for example, reflective layer (such as aluminum, aluminum alloy, or other reflective materials) deposition, along with one or more patterning, masking and/or etching steps. The movable reflective layer 14 can be patterned into individual and parallel strips that form, for example, the columns of the display. The movable reflective layer 14 can be electrically conductive, and referred to as an electrically conductive layer. In some implementations, the movable reflective layer 14 may include a plurality of sub-layers 14a, 14b and 14c as shown in FIG. 4D. In some implementations, one or more of the sub-layers, such as sub-layers 14a and 14c, may include highly reflective sub-layers selected for their optical properties, and another sub-layer 14b may include a mechanical sub-layer selected for its mechanical properties. In some implementations, the mechanical sub-layer may include a dielectric material. Since the sacrificial layer 25 is still present in the partially fabricated IMOD display element formed at block 88, the movable reflective layer 14 is typically not movable at this stage. A partially fabricated IMOD display element that contains a sacrificial layer 25 also may be referred to herein as an "unreleased" IMOD.

The process 80 continues at block 90 with the formation of a cavity 19. The cavity 19 may be formed by exposing the sacrificial material 25 (deposited at block 84) to an etchant. For example, an etchable sacrificial material such as Mo or amorphous Si may be removed by dry chemical etching by exposing the sacrificial layer 25 to a gaseous or vaporous etchant, such as vapors derived from solid $XeF_2$ for a period of time that is effective to remove the desired amount of material. The sacrificial material is typically selectively removed relative to the structures surrounding the cavity 19. Other etching methods, such as wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD display element may be referred to herein as a "released" IMOD.

In some implementations, the packaging of an EMS component or device, such as an IMOD-based display, can include a backplate (alternatively referred to as a backplane, back glass or recessed glass) which can be configured to protect the EMS components from damage (such as from mechanical interference or potentially damaging substances). The backplate also can provide structural support for a wide range of components, including but not limited to driver circuitry, processors, memory, interconnect arrays, vapor barriers, product housing, and the like. In some implementations, the use of a backplate can facilitate integration of components and thereby reduce the volume, weight, and/or manufacturing costs of a portable electronic device.

Figure 5A:
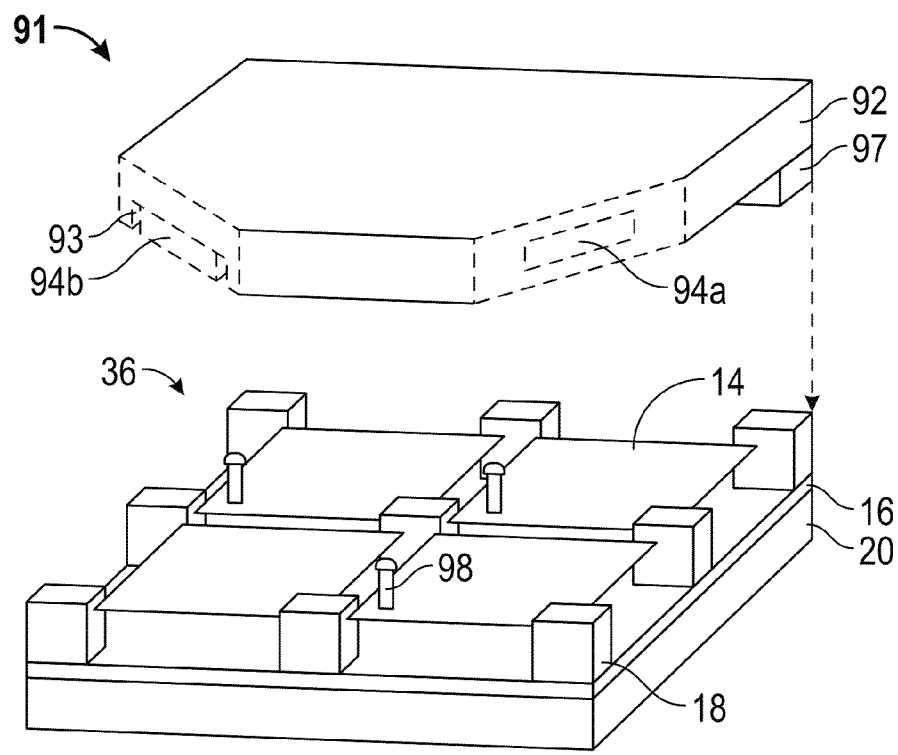
FIGS. 5A and 5B are schematic exploded partial perspective views of a portion of an electromechanical systems (EMS) package including an array of EMS elements and a backplate.
Figure 5B:
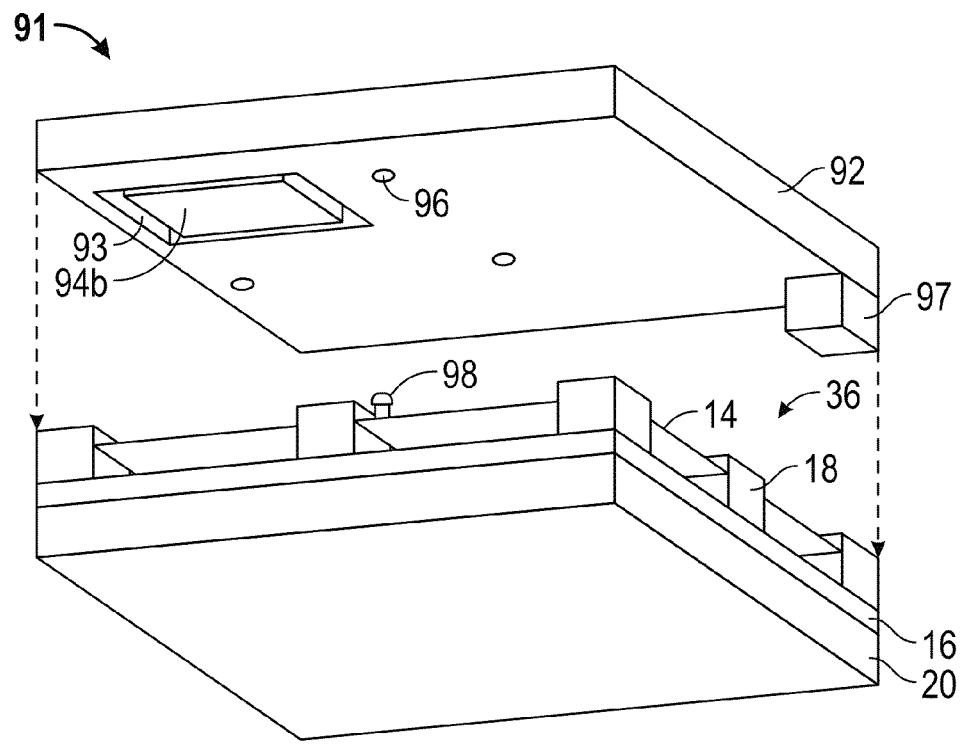

FIGS. 5A and 5B are schematic exploded partial perspective views of a portion of an EMS package 91 including an array 36 of EMS elements and a backplate 92. FIG. 5A is shown with two corners of the backplate 92 cut away to better illustrate certain portions of the backplate 92, while FIG. 5B is shown without the corners cut away. The EMS array 36 can include a substrate 20, support posts 18, and a movable layer 14. In some implementations, the EMS array 36 can include an array of IMOD display elements with one or more optical stack portions 16 on a transparent substrate, and the movable layer 14 can be implemented as a movable reflective layer.

The backplate 92 can be essentially planar or can have at least one contoured surface (e.g., the backplate 92 can be formed with recesses and/or protrusions). The backplate 92 may be made of any suitable material, whether transparent or opaque, conductive or insulating. Suitable materials for the backplate 92 include, but are not limited to, glass, plastic, ceramics, polymers, laminates, metals, metal foils, Kovar and plated Kovar.

As shown in FIGS. 5A and 5B, the backplate 92 can include one or more backplate components 94a and 94b, which can be partially or wholly embedded in the backplate 92. As can be seen in FIG. 5A, backplate component 94a is embedded in the backplate 92. As can be seen in FIGS. 5A and 5B, backplate component 94b is disposed within a recess 93 formed in a surface of the backplate 92. In some implementations, the backplate components 94a and/or 94b can protrude from a surface of the backplate 92. Although backplate component 94b is disposed on the side of the backplate 92 facing the substrate 20, in other implementations, the backplate components can be disposed on the opposite side of the backplate 92.

The backplate components 94a and/or 94b can include one or more active or passive electrical components, such as transistors, capacitors, inductors, resistors, diodes, switches, and/or integrated circuits (ICs) such as a packaged, standard or discrete IC. Other examples of backplate components that can be used in various implementations include antennas, batteries, and sensors such as electrical, touch, optical, or chemical sensors, or thin-film deposited devices.

In some implementations, the backplate components 94a and/or 94b can be in electrical communication with portions of the EMS array 36. Conductive structures such as traces, bumps, posts, or vias may be formed on one or both of the backplate 92 or the substrate 20 and may contact one another or other conductive components to form electrical connections between the EMS array 36 and the backplate components 94a and/or 94b. For example, FIG. 5B includes one or more conductive vias 96 on the backplate 92 which can be aligned with electrical contacts 98 extending upward from the movable layers 14 within the EMS array 36. In some implementations, the backplate 92 also can include one or more insulating layers that electrically insulate the backplate components 94a and/or 94b from other components of the EMS array 36. In some implementations in which the backplate 92 is formed from vapor-permeable materials, an interior surface of backplate 92 can be coated with a vapor barrier (not shown).

The backplate components 94a and 94b can include one or more desiccants which act to absorb any moisture that may enter the EMS package 91. In some implementations, a desiccant (or other moisture absorbing materials, such as a getter) may be provided separately from any other backplate components, for example as a sheet that is mounted to the backplate 92 (or in a recess formed therein) with adhesive. Alternatively, the desiccant may be integrated into the backplate 92. In some other implementations, the desiccant may be applied directly or indirectly over other backplate components, for example by spray-coating, screen printing, or any other suitable method.

In some implementations, the EMS array 36 and/or the backplate 92 can include mechanical standoffs 97 to maintain a distance between the backplate components and the display elements and thereby prevent mechanical interference between those components. In the implementation illustrated in FIGS. 5A and 5B, the mechanical standoffs 97 are formed as posts protruding from the backplate 92 in alignment with the support posts 18 of the EMS array 36. Alternatively or in addition, mechanical standoffs, such as rails or posts, can be provided along the edges of the EMS package 91.

Although not illustrated in FIGS. 5A and 5B, a seal can be provided which partially or completely encircles the EMS array 36. Together with the backplate 92 and the substrate 20, the seal can form a protective cavity enclosing the EMS array 36. The seal may be a semi-hermetic seal, such as a conventional epoxy-based adhesive. In some other implementations, the seal may be a hermetic seal, such as a thin film metal weld or a glass frit. In some other implementations, the seal may include polyisobutylene (PIB), polyurethane, liquid spin-on glass, solder, polymers, plastics, or other materials. In some implementations, a reinforced sealant can be used to form mechanical standoffs.

In alternate implementations, a seal ring may include an extension of either one or both of the backplate 92 or the substrate 20. For example, the seal ring may include a mechanical extension (not shown) of the backplate 92. In some implementations, the seal ring may include a separate member, such as an O-ring or other annular member.

In some implementations, the EMS array 36 and the backplate 92 are separately formed before being attached or coupled together. For example, the edge of the substrate 20 can be attached and sealed to the edge of the backplate 92 as discussed above. Alternatively, the EMS array 36 and the backplate 92 can be formed and joined together as the EMS package 91. In some other implementations, the EMS package 91 can be fabricated in any other suitable manner, such as by forming components of the backplate 92 over the EMS array 36 by deposition.

FIGS. 6A-6E show examples of how a single IMOD (IMOD) may be configured to produce different colors. Multistate IMODs (MS-IMODs) and analog IMODs (A-IMODs) are both considered to be examples of the broader class of IMODs.

In an MS-IMOD, a pixel's reflective color may be varied by changing the gap height between an absorber stack and a reflector stack. In FIGS. 6A-6E, the IMOD 600 includes the reflector stack 605 and the absorber stack 610. In this implementation, the absorber stack 610 is partially reflective and partially absorptive. Here, the reflector stack 605 includes at least one metallic reflective layer, which also may be referred to herein as a mirrored surface or a metal mirror.

In some implementations, the absorber layer may be formed of a partially absorptive and partially reflective layer. The absorber layer may be part of an absorber stack that includes other layers, such as one or more dielectric layers, an electrode layer, etc. According to some such implementations, the absorber stack may include a dielectric layer, a metal layer and a passivation layer. In some implementations, the dielectric layer may be formed of $SiO_2$, SiON, $MgF_2$, $Al_2O_3$ and/or other dielectric materials. In some implementations, the metal layer may be formed of Cr, W, Ni, V, Ti, Rh, Pt, Ge, Co and/or MoCr. In some implementations, the passivation layer may include $Al_2O_3$ or another dielectric material.

The mirrored surface may, for example, be formed of a reflective metal such as Al, silver, etc. The mirrored surface may be part of a reflector stack that includes other layers, such as one or more dielectric layers. Such dielectric layers may be formed of $TiO_2$, $Si_3N_4$, $ZrO_2$, $Ta_2O_5$, $Sb_2O_3$, $HfO_2$, $Sc_2O_3$, $In_2O_3$, $Sn:In_2O_3$, $SiO_2$, SiON, $MgF_2$, $Al_2O_3$, $HfF_4$, $YbF_3$, $Na_3AlF_6$ and/or other dielectric materials.

In FIGS. 6A-6E, the reflector stack 605 is shown at five positions relative to the absorber stack 610. However, an IMOD 600 may be movable between substantially more than 5 positions relative to the reflector stack 605. For example, in some A-IMOD implementations, the gap height 630 between the reflector stack 605 and the absorber stack 610 may be varied in a substantially continuous manner. In some such IMODs 600, the gap height 630 may be controlled with a high level of precision, e.g., with an error of 10 nm or less. Although the absorber stack 610 includes a single absorber layer in this example, alternative implementations of the absorber stack 610 may include multiple absorber layers. Moreover, in alternative implementations, the absorber stack 610 may not be partially reflective.

An incident wave having a wavelength $\lambda$ will interfere with its own reflection from the reflector stack 605 to create a standing wave with local peaks and nulls. The first null is $\lambda/2$ from the mirror and subsequent nulls are located at $\lambda/2$ intervals. For that wavelength, a thin absorber layer placed at one of the null positions will absorb very little energy.

Figure 6A:
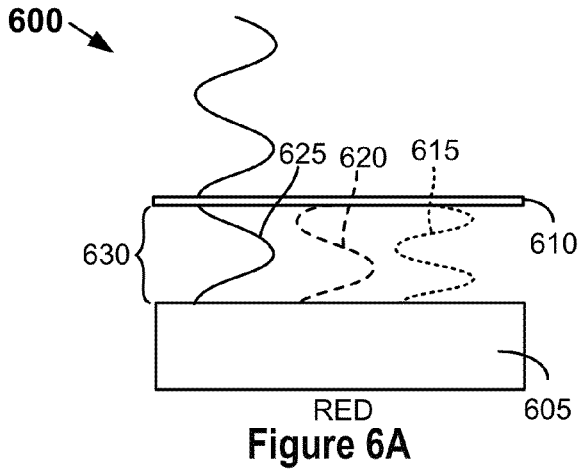
FIGS. 6A-6E show examples of how an IMOD may be configured to produce different colors.

Referring first to FIG. 6A, when the gap height 630 is substantially equal to the half wavelength of a red wavelength of light 625 (also referred to herein as a red color), the absorber stack 610 is positioned at the null of the red standing wave interference pattern. The absorption of the red wavelength of light 625 is near zero because there is almost no red light at the absorber. At this configuration, constructive interference appears between red wavelengths of light reflected from the absorber stack 610 and red wavelengths of light reflected from the reflector stack 605. Therefore, light having a wavelength substantially corresponding to the red wavelength of light 625 is reflected efficiently. Light of other colors, including the blue wavelength of light 615 and the green wavelength of light 620, has a high intensity field at the absorber and is not reinforced by constructive interference. Instead, such light is substantially absorbed by the absorber stack 610.

Figure 6B:
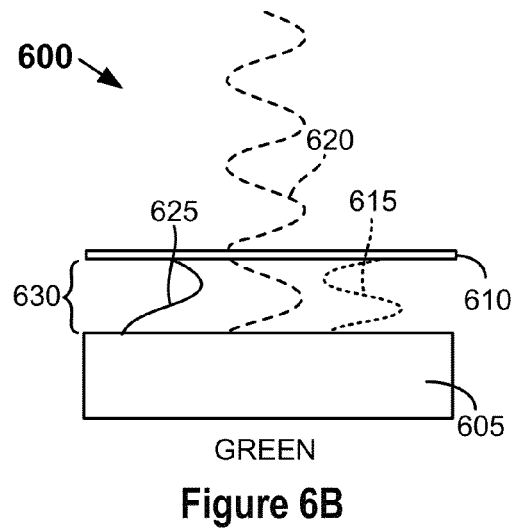

FIG. 6B depicts the IMOD 600 in a configuration wherein the reflector stack 605 is moved closer to the absorber stack 610 (or vice versa). In this example, the gap height 630 is substantially equal to the half wavelength of the green wavelength of light 620. The absorber stack 610 is positioned at the null of the green standing wave interference pattern. The absorption of the green wavelength of light 620 is near zero because there is almost no green light at the absorber. At this configuration, constructive interference appears between green light reflected from the absorber stack 610 and green light reflected from the reflector stack 605. Light having a wavelength substantially corresponding to the green wavelength of light 620 is reflected efficiently. Light of other colors, including the red wavelength of light 625 and the blue wavelength of light 615, is substantially absorbed by the absorber stack 610.

Figure 6C:
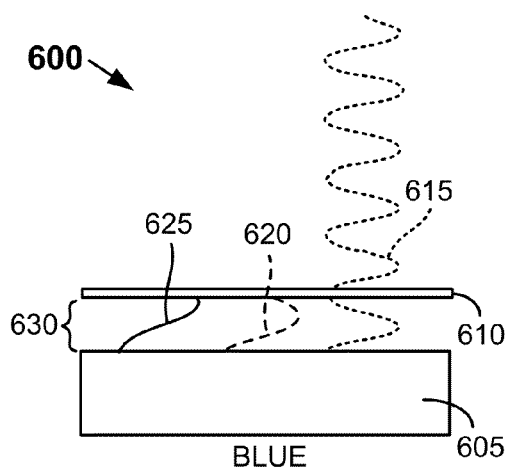

In FIG. 6C, the reflector stack 605 is moved closer to the absorber stack 610 (or vice versa), so that the gap height 630 is substantially equal to the half wavelength of the blue wavelength of light 615. Light having a wavelength substantially corresponding to the blue wavelength of light 615 is reflected efficiently. Light of other colors, including the red wavelength of light 625 and the green wavelength of light 620, is substantially absorbed by the absorber stack 610.

Figure 6D:
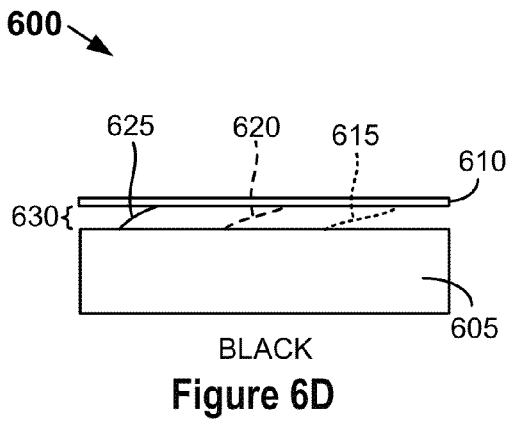

In FIG. 6D, however, the IMOD 600 is in a configuration wherein the gap height 630 is substantially equal to ¼ of the wavelength of the average color in the visible range. In such arrangement, the absorber is located near the intensity peak of the interference standing wave; the strong absorption due to high field intensity together with destructive interference between the absorber stack 610 and the reflector stack 605 causes relatively little visible light to be reflected from the IMOD 600. This configuration may be referred to herein as a "black state." In some such implementations, the gap height 630 may be made larger or smaller than shown in FIG. 6D, in order to reinforce other wavelengths that are outside the visible range. Accordingly, the configuration of the IMOD 600 shown in FIG. 6D provides merely one example of a black state configuration of the IMOD 600.

Figure 6E:
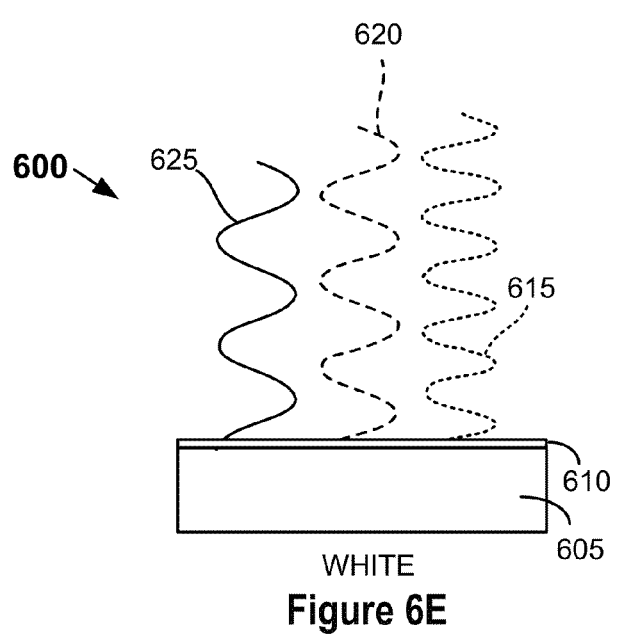

FIG. 6E depicts the IMOD 600 in a configuration wherein the absorber stack 610 is in close proximity to the reflector stack 605. In this example, the gap height 630 is negligible because the absorber stack 610 is substantially adjacent to the reflector stack 605. Light having a broad range of wavelengths is reflected efficiently from the reflector stack 605 without being absorbed to a significant degree by the absorber stack 610. This configuration may be referred to herein as a "white state." However, in some implementations the absorber stack 610 and the reflector stack 605 may be separated to reduce stiction caused by charging via the strong electric field that may be produced when the two layers are brought close to one another. In some implementations, one or more dielectric layers with a total thickness of about $\lambda/2$ may be disposed on the surface of the absorber layer and/or the mirrored surface. As such, the white state may correspond to a configuration wherein the absorber layer is placed at the first null of the standing wave from the mirrored surface of the reflector stack 605.

Figure 7:
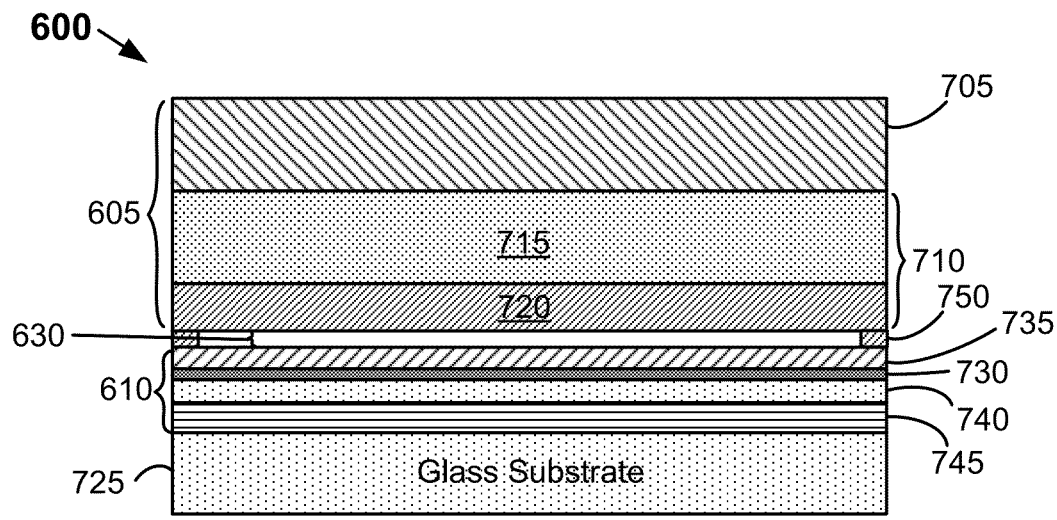
FIG. 7 shows an example of layers that may be included in an IMOD.

FIG. 7 shows an example of layers that may be included in an IMOD. In this example, the reflector stack 605 of IMOD 600 is movable relative to the absorber stack 610. Here, the reflector stack 605 includes a metal mirror 705 and a dielectric stack 710. In this example, metal mirror 705 is formed of AlCu and has a thickness of approximately 50 nm. However, the metal mirror 705 may be formed of other reflective metals such as Al, silver, etc., and may have a different thickness. Some implementations may include a non-metal mirror. The dielectric stack 710 may include one or more dielectric layers formed of $TiO_2$, $Si_3N_4$, $ZrO_2$, $Ta_2O_5$, $Sb_2O_3$, $HfO_2$, $Sc_2O_3$, $In_2O_3$, $Sn:In_2O_3$, $SiO_2$, SiON, $MgF_2$, $Al_2O_3$, $HfF_4$, $YbF_3$, $Na_3AlF_6$ and/or other dielectric materials. In this example, the dielectric stack 710 includes a low index layer 715 and a high index layer 720.

The low index layer 715 has a relatively low index of refraction as compared to the high index layer 720. The low index layer 715 also may have a relatively low chromatic dispersion as compared to the chromatic dispersion of the high index layer 720. In this example, the low index layer 715 is formed of SiON and has a thickness of approximately 80 nm, although other thicknesses are also possible. In other implementations, however, the low index layer 715 may be formed of other materials, such as $SiO_2$, and may have a different thickness.

In this implementation, the high index layer 720 is formed of $TiO_2$ and has a thickness of approximately 21 nm, although other thicknesses are also possible. In other implementations, however, the low index layer 715 may be formed of other materials, such as $ZrO_2$ or $Nb_2O_5$, and may have a different thickness.

The absorber stack 610 is formed on a substantially transparent substrate 725. In this example, the substrate 725 is formed of glass. However, in other implementations the substrate 725 may be formed of one or more other substantially transparent materials, such as plastic, a polymer, etc.

Here, the absorber stack 610 includes an absorber layer 730, a passivation layer 735, a low dispersion layer 740 and a high dispersion layer 745. Other absorber stacks 610 may include more or fewer layers. In this implementation, the absorber layer 730 is formed of MoCr and has a thickness of approximately 6 nm, the passivation layer 735 is formed of $Al_2O_3$ and has a thickness of approximately 11 nm, the low dispersion layer 740 is formed of $SiO_2$ and has a thickness of approximately 15 nm, and the high dispersion layer 745 is formed of $SiN_x$ and has a thickness of approximately 36 nm. However, in other implementations, layers of the absorber stack 610 may be formed of other materials and may have different thicknesses. In some implementations, the layers 740 and 745 may be impedance-matching layers, such as those described below.

As noted above with reference to FIG. 6E, a configuration wherein the reflector stack 605 is in close proximity to the absorber stack 610 corresponds to a white state of the IMOD 600. Another example of a white state configuration is provided in FIG. 7, wherein a 10 nm gap height 630 is defined between the reflector stack 605 facing the absorber stack 610 when the protrusions 750 are in contact with the absorber stack 610. In this example, protrusions 750, which may also be referred to herein as "dimples," have been fabricated on a surface of the reflector stack 605 facing the absorber stack 610. The protrusions 750 or dimples may also help prevent stiction between the reflector stack 605 and the absorber stack 610. In alternative implementations, one or more of the protrusions 750 may be formed on the absorber stack 610. Some implementations may not include any of the protrusions 750.

Figure 8:
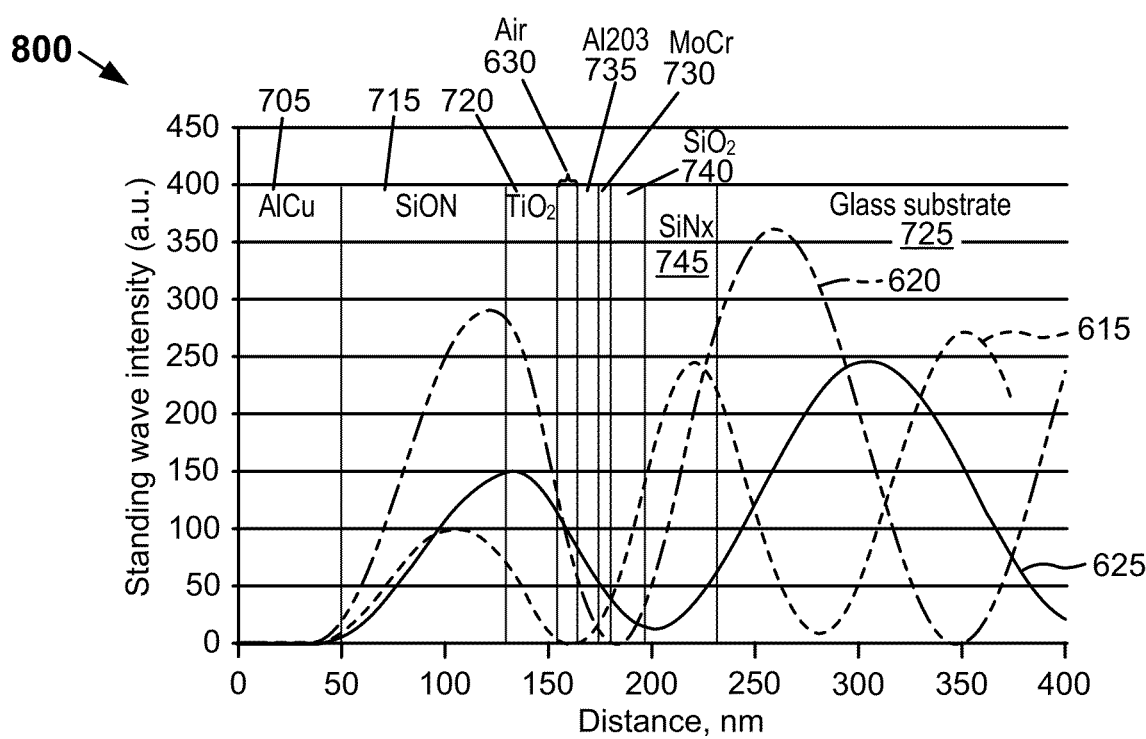
FIG. 8 is a diagram that shows standing wave field intensities for the IMOD of FIG. 7.

FIG. 8 is a diagram that shows standing wave field intensities for the IMOD of FIG. 7. In the diagram 800, representing one model for understanding reflective properties of the IMOD, standing wave field intensities for a blue wavelength of light 615, a green wavelength of light 620 and a red wavelength of light 625 are superimposed on representations of the layers of one implementation of the IMOD 600.

In the example shown in FIG. 8, a white state would be achieved when the gap height 630 is in the range of 0 to 20 nm. By comparing the separation between the red, green and blue peaks in the reflector stack 605 with those in the absorber stack 610 (or with the separations between the red, green and blue peaks of the standing waves in air shown in FIGS. 6A-6E), it may be observed that the dielectric stack 710 is configured to reduce a standing wave node separation. However, there is still no location for the absorber layer 730 where the field intensity of red, green and blue are all at a minimum. In the example shown in FIG. 8, the gap height 630 is 10 nm and the absorber layer 730 is located near the minimum field intensity of green wavelength of light 620. However, the field intensity of the blue wavelength of light 615 and the red wavelength of light 625 are relatively high compared to the green wavelength of light 620. As a result, the absorption of red and blue is higher than that of green (and, therefore, less red and blue is reflected); consequently, the reflectivity of green is significantly greater than that of red and blue. Therefore, the white-state color is slightly tinted with green.

Figure 9:
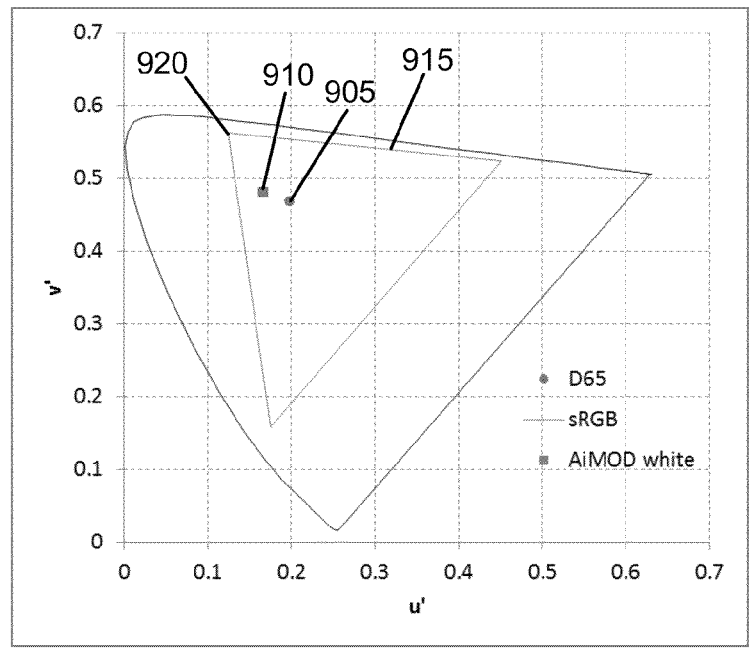
FIG. 9 is a graph that shows the white state of the IMOD of FIG. 7 in (u', v') color space.

FIG. 9 is a graph that shows the white state of the IMOD of FIG. 7 in (u', v') color space. The graph 900 indicates the position 905 of CIE Standard Illuminant D65 ("D65") and the position 910, which corresponds to the white state of the IMOD 600 of FIG. 7 within the sRGB color space 915. As noted in the graph 900, the position 910 corresponding to the white state of the IMOD 600 is between the position 905 of D65 and the green vertex 920 of the sRGB color space 915. This indicates that the white-state color of the IMOD 600 is slightly tinted with green.

Figure 10:
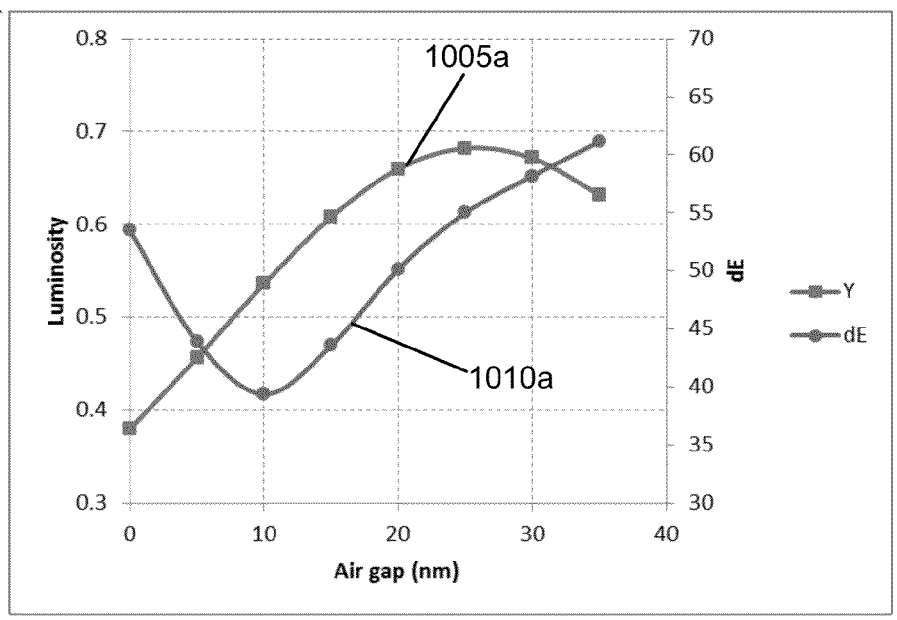
FIG. 10 is a graph that shows the luminosity Y and dE, the distance to D65 in L*a*b* space, as a function of gap height, for the IMOD of FIG. 7.

FIG. 10 is a graph that shows the luminosity Y and dE, the distance to D65 in L*a*b* space, as a function of gap height, for the IMOD of FIG. 7. The graph 1000 indicates the luminosity curve 1005a and the dE curve 1010a. For an IMOD design, it is advantageous to maximize the luminosity value and to minimize the dE value, in order to make the white state as white as possible. The minimum value of dE (39.4), shown as a local minimum of the dE curve 1010a, corresponds with a gap height of approximately 10 nm. Unfortunately, the luminosity value for a 10 nm gap height is only about 0.54. The maximum luminosity value corresponds with an air gap of 25 nm. However, with a gap height of 25 nm, the value of dE is approximately 55. This is unacceptably far from the ideal white state of D65.

One solution to the problem of a white state that is slightly tinted with green is to apply a pixel spatial and/or temporal dithering technique that mixes the green-tinted white with other colors to synthesize a more perfect white. However, spatial dithering techniques may reduce display brightness and introducing spatial dithering noise. In addition, spatial dithering techniques may consume additional processing overhead (thereby using more power). Temporal dithering can also increase power consumption.

Figure 11:
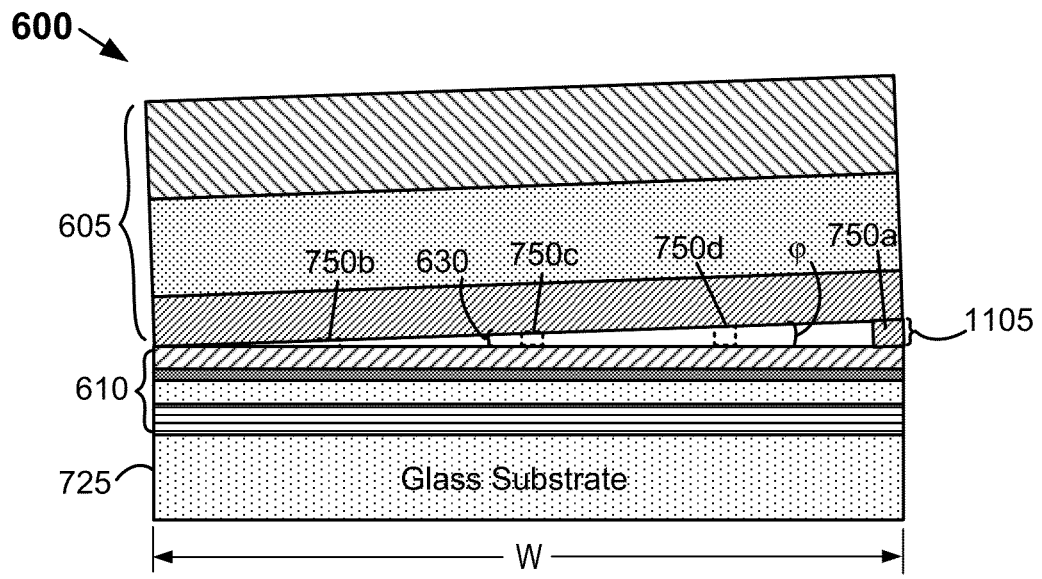
FIG. 11 shows an example of an IMOD that is configured to be tilted when in a white state position.

FIG. 11 shows an example of an IMOD that is configured to be tilted when in a white state position. The IMOD 600 in FIG. 11 may be substantially similar to the IMOD shown in FIG. 7. However, in this example the IMOD 600 includes at least one protrusion, the protrusion 750a, having a height 1105. The protrusion 750a causes the reflector stack 605 to be tilted by an angle φ relative to the absorber stack 610 when the reflector stack 605 is in close proximity to the absorber stack 610. In some implementations, the angle φ may be less than one degree.

Accordingly, such implementations may involve tilting the reflector stack 605 relative to the absorber stack 610 when the IMOD 600 is in a white state position. In this example, the protrusion 750a causes the gap height 630 to vary from a maximum white state gap height near the protrusion 750a to a minimum white state gap height on an opposing side of the IMOD 600. The change in white state gap height causes color averaging when the IMOD 600 is in a white state position.

Some implementations may include additional protrusions 750, some of which may have heights that are different from the height 1105. FIG. 11 shows optional protrusions 750b, 750c and 750d, each of which has a height that is different from the height 1105. In this example, the protrusions 750a-750d are all formed on the reflector stack 605. However, in alternative implementations, at least some of the protrusions 750 may be formed on the absorber stack 210. Moreover, in the example shown in FIG. 11, the protrusion 750 having the greatest height 1105 is positioned near an edge of the IMOD 600. In alternative implementations, the protrusion 750 having the greatest height 1105 may be positioned in another location, for example near a central portion of the IMOD 600.

Figure 12:
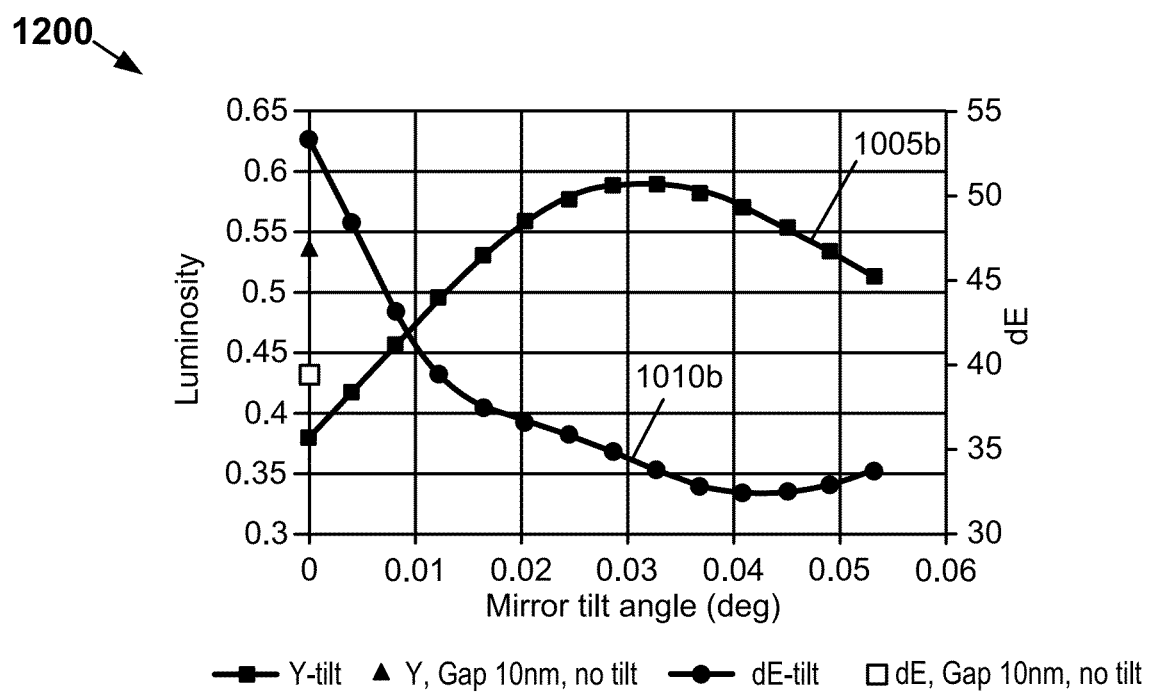
FIG. 12 is a graph that shows the luminosity and dE as a function of mirror tilt angle for the IMOD of FIG. 11.

FIG. 12 is a graph that shows the luminosity and dE as a function of mirror tilt angle for the IMOD of FIG. 11. The graph 1200 indicates that the optimum performance for the IMOD 600 of FIG. 11 is obtained at a tilt angle ϕ of approximately 0.033 degrees, which corresponds with a dE value of about 33 and a luminosity of about 0.59. This tilt angle may be achieved by making the protrusion 750a shown in FIG. 11 about 40 nm in height, assuming that the width W of the absorber stack 610 is approximately 70 μm. As a reference, the luminosity and dE for the IMOD of FIG. 7 at a 10 nm gap height are indicated in FIG. 12 by the triangle and the square, respectively, on the luminosity axis. By comparing the luminosity and dE values for the tilt angle of approximately 0.033 degrees with the luminosity and dE values for the triangle and the square, one can see that tilting the movable reflective stack by approximately 0.033 degrees results in approximately a 14% decrease in dE and approximately a 10% increase in luminosity. Therefore, both the whiteness of the white state and the luminosity may be improved by tilting the reflector stack 605 relative to the absorber stack 610 when the IMOD 600 is in a white state.

Figure 13:
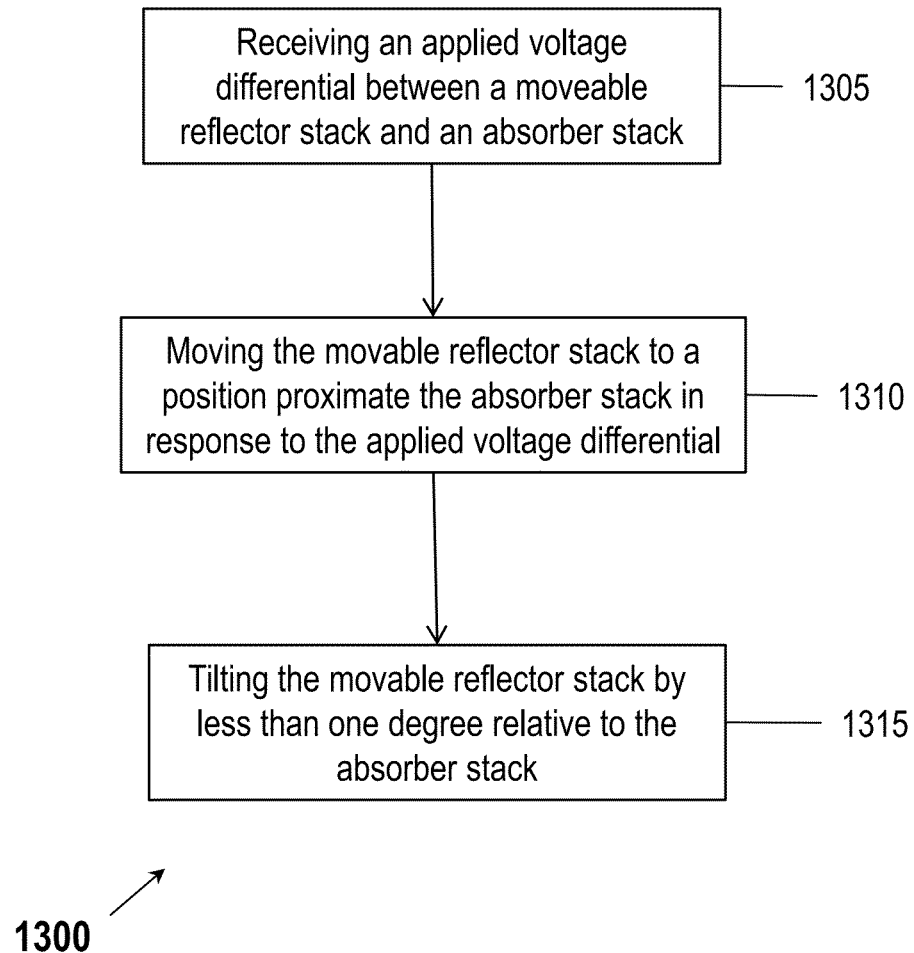
FIG. 13 is a flow diagram that outlines a process of controlling an IMOD such as that shown in FIG. 11.

FIG. 13 is a flow diagram that outlines a process of controlling an IMOD such as that shown in FIG. 11. The method 1300 is described from the perspective of a single IMOD of a display. In block 1305, an IMOD 600 receives an applied voltage differential between a moveable reflector stack and an absorber stack. For example, the voltage differential may be applied by an array driver 22 such as that shown in FIG. 2 and described above. The voltage differential may be applied between a row electrode and column electrode of the IMOD 600. In some such examples, the metal mirror 705 may correspond to one of these electrodes and the absorber layer 730 may correspond to the other electrode.

In this example, the voltage differential corresponds to a white state configuration of the IMOD 600. Accordingly, block 1310 involves moving the movable reflector stack to a position proximate the absorber stack in response to the applied voltage differential. Block 1315 involves tilting the movable reflector stack by less than one degree relative to the absorber stack. In one implementation, the movable reflector can be tilted by a first protrusion disposed on the movable reflector stack or the absorber stack which comes in contact with the other stack. The tilting process of block 1315 may cause color averaging when the IMOD is in a white state.

In some implementations, the first protrusion has a first height. The tilting process of block 1315 may involve causing a second protrusion to make contact with the movable reflector stack or the absorber stack. The second protrusion may have a second height.

In some implementations, the IMOD 600 may include a plurality of additional protrusions having varying heights that are different from the first height. Block 1315 may involve causing the plurality of additional protrusions to make contact with the movable reflector stack or the absorber stack.

As noted above, it can be challenging to produce an acceptable white state in an IMOD 600. It also may be difficult to produce a saturated red color. When the IMOD is configured in a $1^{st}$-order red state, the absorber layer 730 is positioned at the minimum field intensity of the corresponding red standing wave. However, the standing wave of the $2^{nd}$-order blue is also quite weak at this position of the absorber layer 730, resulting in an insufficient absorption of the blue spectrum. This $2^{nd}$-order blue leakage reflection contaminates the red spectrum and causes it to de-saturate.

Figure 14:
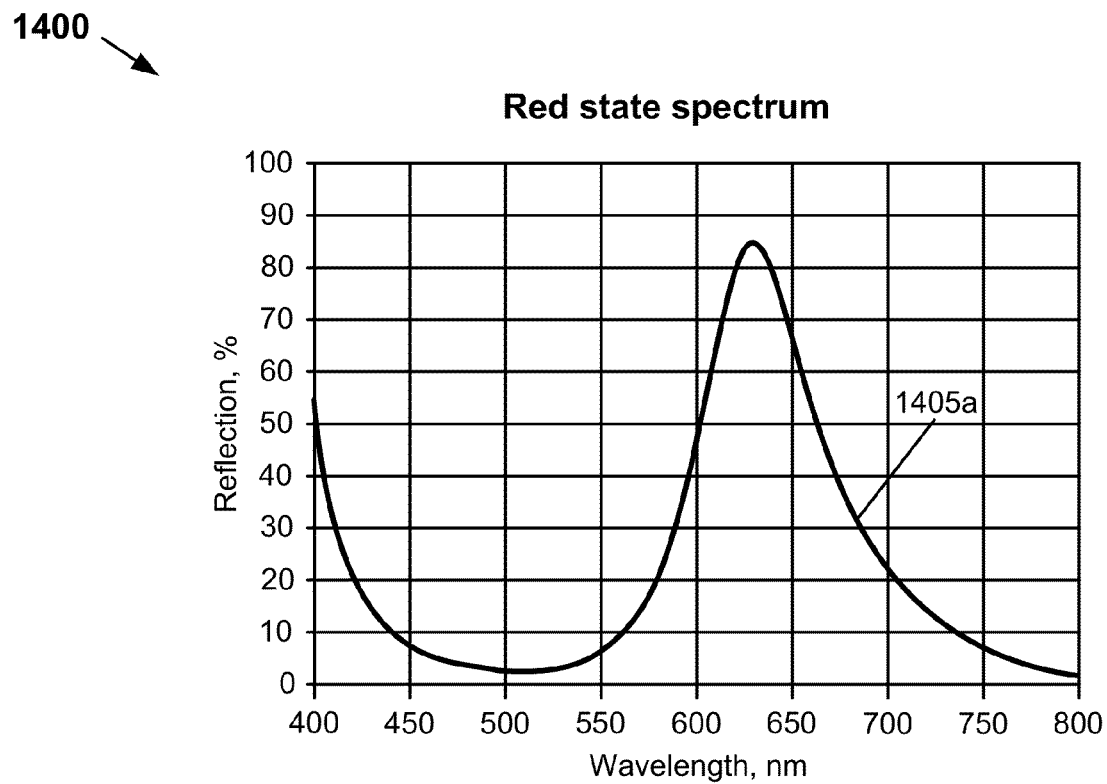
FIG. 14 is a graph that shows an example of a red state spectrum of an IMOD.

FIG. 14 is a graph that shows an example of a red state spectrum of an IMOD. In this example, the red state spectrum 1405a corresponds to a $1^{st}$-order red state of an IMOD 600 similar to that shown in FIG. 7. However, in this example the IMOD 600 does not include the dielectric layers 740 or 745. As shown in the graph 1400, there is a significant reflection from the blue range of wavelengths, which causes the red color to de-saturate.

Figure 15:
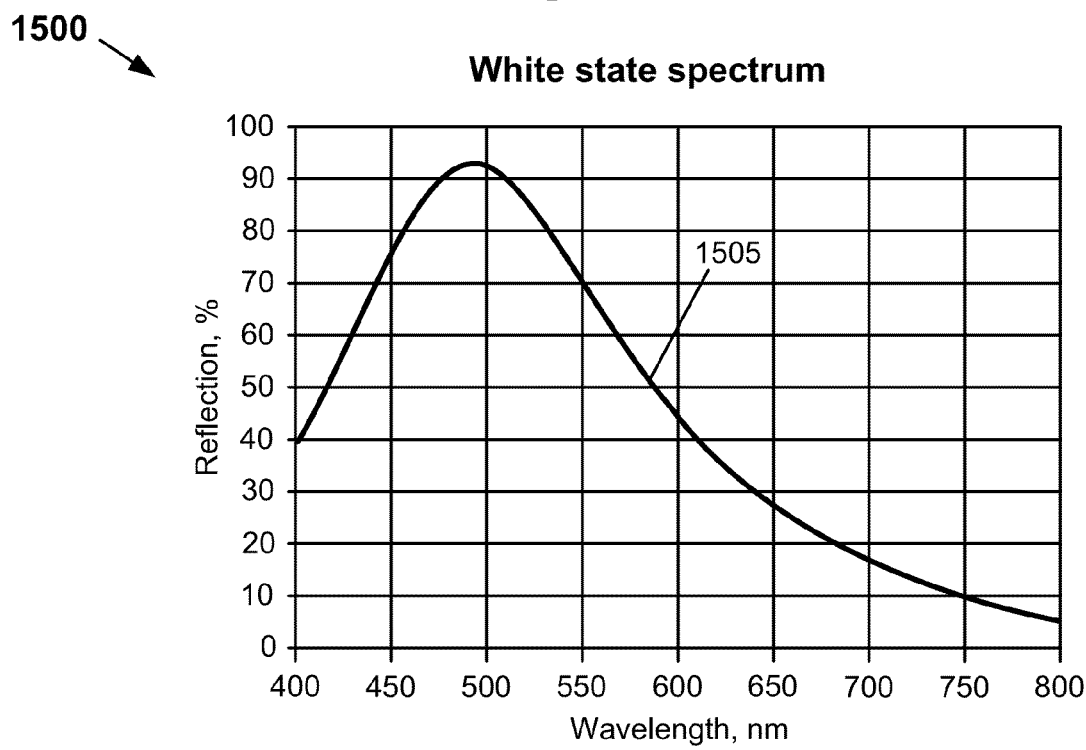
FIG. 15 is a graph that shows a white state spectrum of the IMOD used to produce the graph of FIG. 14.

FIG. 15 is a graph that shows a white state spectrum of the IMOD used to produce the graph of FIG. 14. As shown in the graph 1500, the white state spectrum 1505 for this IMOD indicates a significantly low reflection from the red wavelengths.

Many implementations of an IMOD use MoCr films as a part of the absorber layer or absorber stack. Both the red state spectrum 1405a and the white state spectrum 1505 indicate that a reduced absorption in the red spectrum and, simultaneously, an increased absorption in the blue spectrum could provide improved IMOD performance. However, the extinction coefficient (k) of MoCr films tends to increase with wavelength (that is, absorption of MoCr tends to be larger for red than for blue), sometimes quite substantially.

Figure 16:
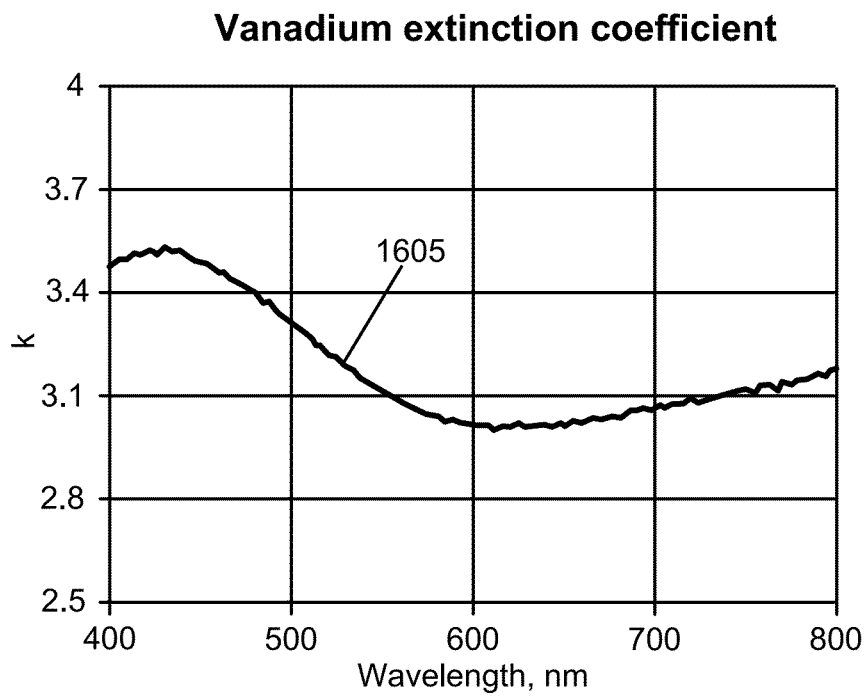
FIG. 16 is a graph that shows the extinction coefficient of vanadium as a function of wavelength.

FIG. 16 is a graph that shows an example of the extinction coefficient of vanadium as a function of wavelength. As shown in the graph 1600, the vanadium extinction coefficient curve 1605 has a higher value in the blue wavelength range than in the red wavelength range. Accordingly, some IMODs described herein include an absorber layer 730 that is formed, at least in part, from vanadium.

Figure 17:
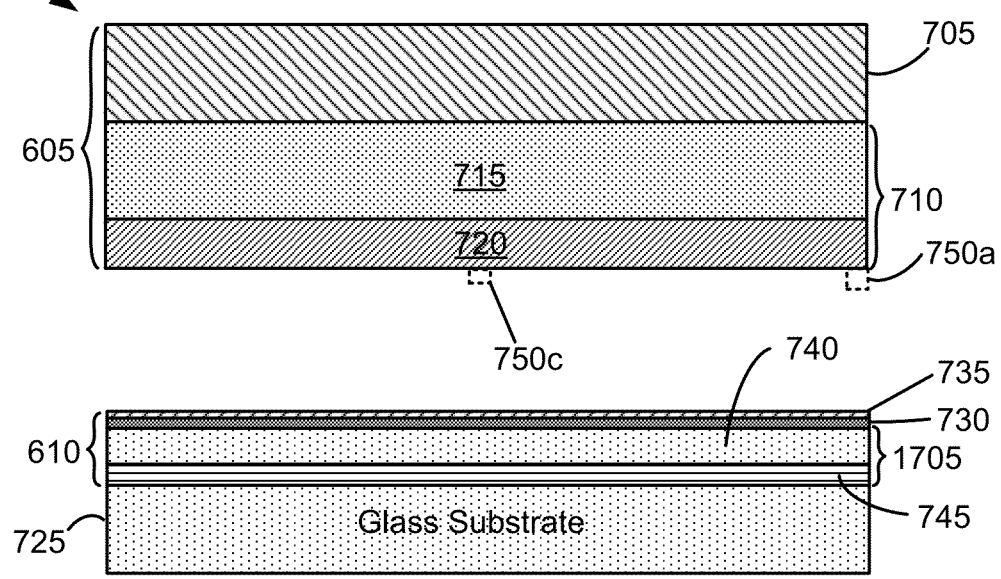
FIG. 17 shows an example of an IMOD having a vanadium absorber layer.

FIG. 17 shows an example of an IMOD having a vanadium absorber layer. In some implementations, the reflector stack 605 may be substantially similar to that of the IMOD 600 shown in FIG. 7. In this example, the metal mirror 705 is formed of AlCu and is approximately 50 nm thick. However, the metal mirror 705 may be formed of other reflective materials such as Al, silver, etc., and may have a different thickness. The dielectric stack 710 may include one or more dielectric layers formed of $TiO_2$, $Si_3N_4$, $ZrO_2$, $Ta_2O_5$, $Sb_2O_3$, $HfO_2$, $Sc_2O_3$, $In_2O_3$, $Sn:In_2O_3$, $SiO_2$, SiON, $MgF_2$, $Al_2O_3$, $HfF_4$, $YbF_3$, $Na_3AlF_6$ and/or other dielectric materials. In this example, the dielectric stack 710 includes a low index layer 715 and a high index layer 720.

In this example, the low index layer 715 is formed of SiON and has a thickness of approximately 72 nm. In other implementations, however, the low index layer 715 may be formed of one or more other materials, such as $SiO_2$, and may have a different thickness. Here, the high index layer 720 is formed of $TiO_2$ and has a thickness of approximately 31 nm. In other implementations, however, the high index layer 720 may be formed of one or more other materials and may have a different thickness.

In some implementations, one or more protrusions 750 (such as optional protrusions 750a and 750c shown in FIG. 17) may be formed on the reflector stack 605 or the absorber stack 610. Accordingly, the protrusion(s) 750 may cause the reflector stack 605 to be tilted relative to the absorber stack 610 when the reflector stack 605 is in close proximity to the absorber stack 610, e.g., when the IMOD 600 is in a white state position. Therefore, the protrusion(s) 750 may cause color averaging when the IMOD 600 is in a white state position.

The absorber stack 610 includes an absorber layer 730 that is formed, at least in part, from vanadium. In this implementation, the passivation layer 735 is formed of $Al_2O_3$ and is approximately 11 nm thick, and the absorber layer 730 is formed of vanadium and is approximately 7.5 nm thick. Here, the low dispersion layer 740 is formed of $SiO_2$ and is approximately 27 nm thick, whereas the high dispersion layer 745 is formed of $Si_3N_4$ and is approximately 22 nm thick. In other implementations, the elements of the absorber stack 610 may be formed of other materials and may have other thicknesses. For example, the absorber layer 730 may be formed, at least in part, from MoCr, germanium or osmium. For example, the absorber layer 730 may include osmium or an alloy of osmium. The low dispersion layer 740 may be formed, at least in part, from SiON and the high dispersion layer 745 may be formed, at least in part, from another type of $SiN_x$ and/or from $TiO_2$.

In this example, the low dispersion layer 740 and the high dispersion layer 745 form an impedance-matching layer 1705, in which the dispersions and/or the indices of refraction of the low dispersion layer 740 and the high dispersion layer 745 are balanced. The thicknesses of the absorber layer 730, the low dispersion layer 740 and the high dispersion layer 745 may be optimized to minimize the reflection when the IMOD color state is black, such that a dark black state is achieved. Moreover, in some implementations the thicknesses of the absorber layer 730, the low dispersion layer 740 and the high dispersion layer 745 may be optimized for providing maximum color saturation of the red state color. In this implementation, the $Si_3N_4$ layer may introduce a slightly higher red absorption in the white state due to a slight increase of the field strength at the location of the absorber layer 730. However, such effects may be reduced by the vanadium absorber layer 730, due to the lower absorption in the red spectrum.

Figure 18:
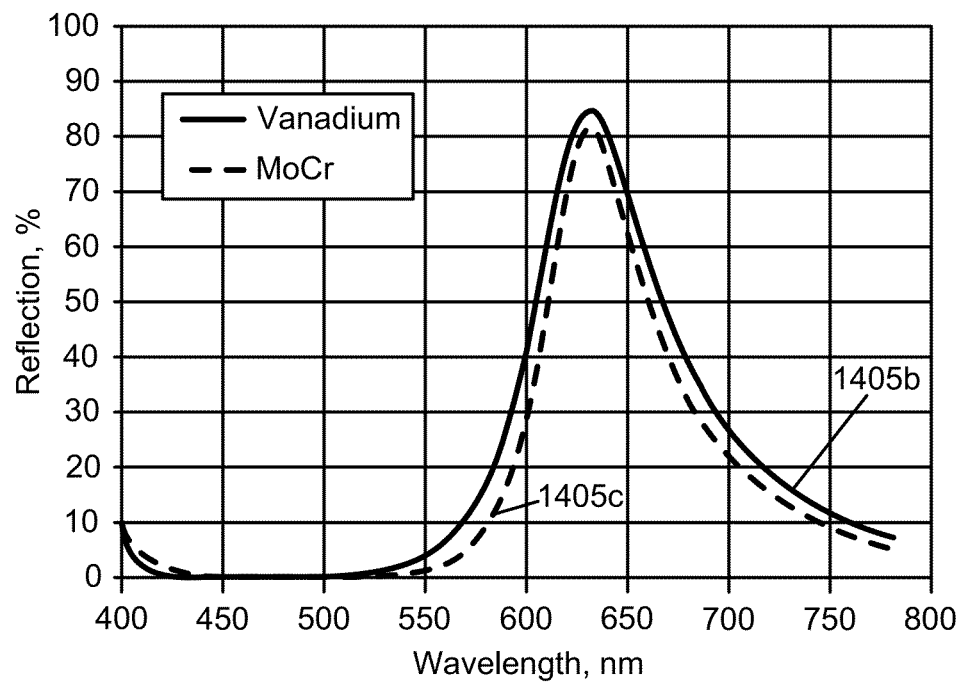
FIG. 18 is a graph that shows red state spectra of two IMODs that are similar to that the IMOD of FIG. 17.

FIG. 18 is a graph that shows red state spectra of two IMODs that are similar to that the IMOD of FIG. 17. In the graph 1800, the red state spectrum 1405b corresponds to an IMOD having an absorber layer 730 formed of vanadium, whereas the red state spectrum 1405c corresponds to an IMOD having an absorber layer 730 formed of MoCr. As compared to the red state spectrum 1405a of FIG. 14, both the red state spectrum 1405b and the red state spectrum 1405c indicate less reflection in the blue wavelength range and a substantially more saturated red state. Hence the presence of the impedance-matching layer 1705 between the substrate 725 and the absorber layer 730 can improve the saturation of red reflections, as compared to IMODs that lack the impedance-matching layer 1705 between the substrate 725 and the absorber layer 730. However, 1405b has a slightly higher and broader peak at about 630 nm wavelength and a lower leakage at about 410 nm to 430 nm wavelength, indicating a brighter and more pure (less blue contamination) red color.

Figure 19A:
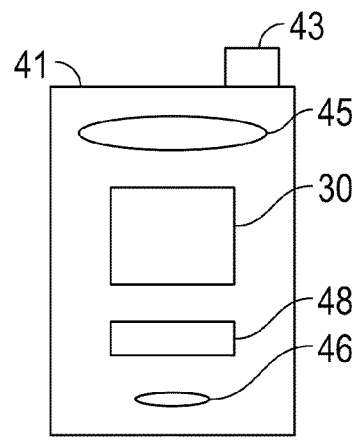
FIGS. 19A and 19B are system block diagrams illustrating a display device 40 that includes a plurality of IMOD display elements.
Figure 19B:
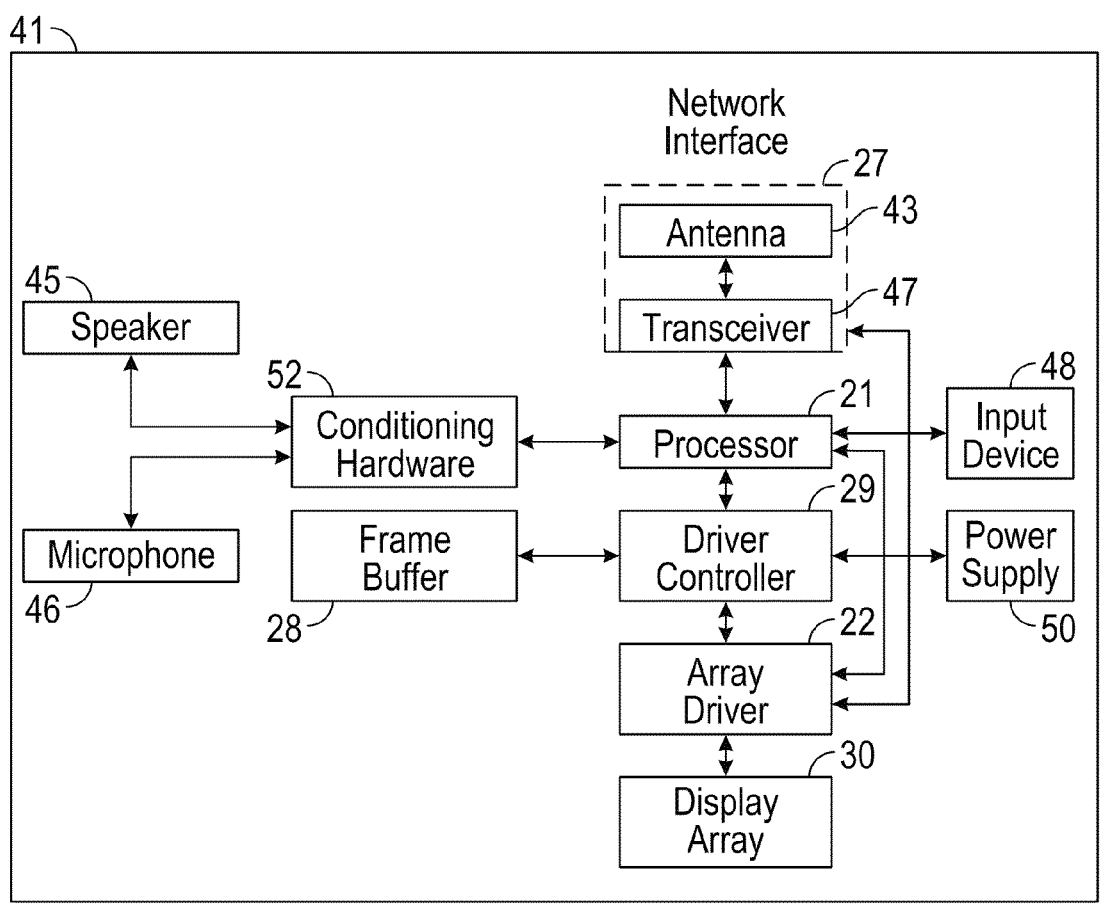

FIGS. 19A and 19B are system block diagrams illustrating a display device 40 that includes a plurality of IMOD display elements. In some implementations, the IMOD display elements may be IMOD display elements as described elsewhere herein. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an IMOD-based display. The display may include IMODs such as those described herein.

The components of the display device 40 are schematically illustrated in FIG. 19A. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 19A, can be configured to function as a memory device and be configured to communicate with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can preprocess the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements.

In some implementations, the driver controller 29, the array driver 22, and the display array 30 are appropriate for any of the types of displays described herein. For example, the driver controller 29 can be a conventional display controller or a bi-stable display controller (such as an IMOD display element controller). Additionally, the array driver 22 can be a conventional driver or a bi-stable display driver (such as an IMOD display element driver). Moreover, the display array 30 can be a conventional display array or a bi-stable display array (such as a display including an array of IMOD display elements). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of, e.g., an IMOD display element as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An interferometric modulator (IMOD), comprising:
   a substrate;
   an absorber stack disposed on the substrate;
   a movable reflector stack including a metal mirror and a dielectric stack, the dielectric stack being disposed between the absorber stack and the metal mirror, the dielectric stack being configured to reduce a standing wave node separation for light reflecting from the movable reflector stack, as compared to light reflecting from the movable reflector stack in the absence of the dielectric stack, such that the IMOD is configured for reflecting a white color when the reflector stack is in close proximity to the absorber stack, the movable reflector stack being further configured to be moved between a plurality of positions relative to the absorber stack, each of the positions corresponding with an IMOD color state including a white state for reflecting the white color, a black state, and one or more other colored states; and
   a first protrusion connected to the movable reflector stack or to the absorber stack,
   wherein the first protrusion has a first height and is configured to cause the movable reflector stack to be tilted relative to the absorber stack when the movable reflector stack is moved close to the absorber stack.

2. The IMOD of claim 1, wherein the first protrusion is configured to cause color averaging when the moveable reflector stack is tilted.

3. The IMOD of claim 2, wherein the first protrusion is configured to cause color averaging when the IMOD is in a white state.

4. The IMOD of claim 1, wherein the first protrusion is connected to a surface of the movable reflector stack facing the absorber layer.

5. The IMOD of claim 1, further including a second protrusion having a second height that is different from the first height.

6. The IMOD of claim 1, further including a plurality of additional protrusions having varying heights that are different from the first height.

7. The IMOD of claim 1, wherein the first protrusion is configured to cause the movable reflector stack to be tilted by less than one degree relative to the absorber stack when the movable reflector stack is moved close to the absorber stack.

8. The IMOD of claim 1, wherein the dielectric stack includes a high-index layer and a low-index layer.

9. The IMOD of claim 8, wherein the low-index layer has a lower chromatic dispersion than that of the high-index layer.

10. The IMOD of claim 8, wherein the low-index layer is formed of SiON or $SiO_2$.

11. The IMOD of claim 8, wherein the high-index layer is formed of $TiO_2$, $ZrO_2$ or $Nb_2O_5$.

12. A display device that includes the IMOD of claim 1.

13. The display device of claim 12, further including a control system configured to control the display device.

14. The display device of claim 13, wherein the control system is configured to process image data.

15. The display device of claim 14, wherein the control system further comprises:
a driver circuit configured to send at least one signal to a display of the display device; and
a controller configured to send at least a portion of the image data to the driver circuit.

16. The display device of claim 14, wherein the control system further comprises:
an image source module configured to send the image data to the processor, wherein the image source module includes at least one of a receiver, transceiver, and transmitter.

17. The display device of claim 14, further comprising:
an input device configured to receive input data and to communicate the input data to the control system.

18. An interferometric modulator (IMOD), comprising:
a substrate;
an absorber stack disposed on the substrate;
a movable reflector stack configured to be moved between a plurality of positions relative to the absorber stack, each of the positions corresponding with an IMOD color state including a white state for reflecting the white color, a black state, and one or more other colored states, the IMOD being configured for reflecting a white color when the reflector stack is in close proximity to the absorber stack, the movable reflector stack including:
a metal mirror; and
node separation reduction means for reducing a standing wave node separation for light reflecting from the movable reflector stack, as compared to light reflecting from the movable reflector stack in the absence of the node separation reduction means; and
tilting means for causing the movable reflector stack to be tilted relative to the absorber layer when the movable reflector is moved close to the absorber layer.

19. The IMOD of claim 18, wherein the tilting means is configured to cause color averaging when the IMOD is in a white state.

20. The IMOD of claim 18, wherein the tilting means includes a first protrusion connected to the movable reflector stack or to the absorber stack, the first protrusion having a first height.

21. The IMOD of claim 20, wherein the tilting means includes a second protrusion having a second height that is different from the first height.

22. The IMOD of claim 18, wherein the node separation reduction means includes a high-index layer and a low-index layer and wherein the node separation reduction means has a lower chromatic dispersion than that of the high-index layer.

23. A method of controlling an interferometric modulator (IMOD), the method comprising:
receiving an applied voltage differential between a moveable reflector stack and an absorber stack;
moving the movable reflector stack to a position proximate the absorber stack in response to the applied voltage differential;
tilting the movable reflector stack by less than one degree relative to the absorber stack by causing a first protrusion disposed on the movable reflector stack or the absorber stack to come in contact with the other stack.

24. The method of claim 23, wherein the first protrusion has a first height and wherein the tilting process involves causing a second protrusion to make contact with the movable reflector stack or the absorber stack, the second protrusion having a second height.

25. The method of claim 23, wherein the first protrusion has a first height and wherein the tilting process involves causing a plurality of additional protrusions to make contact with the movable reflector stack or the absorber stack, the plurality of additional protrusions having varying heights that are different from the first height.

26. The method of claim 23, wherein the tilting process causes color averaging when the IMOD is in a white state.

27. An interferometric modulator (IMOD), comprising:
a substrate;
an absorber stack disposed on the substrate, the absorber stack including an absorber layer that includes a material having a red extinction coefficient value at a red wavelength and a blue extinction coefficient value at a blue wavelength, the blue extinction coefficient value being a higher value than the red extinction coefficient value;
a movable reflector stack configured to be moved between a plurality of positions relative to the absorber stack, each of the positions corresponding with an IMOD color state including a white state for reflecting the white color, a black state, and one or more colored states, the IMOD being configured to reflect a white color when the moveable reflector stack is in close proximity to the absorber stack, the movable reflector stack including:
a metal mirror; and
a dielectric stack disposed between the absorber stack and the metal mirror.

28. The IMOD of claim 27, wherein the absorber stack includes an impedance-matching layer.

29. The IMOD of claim 28, wherein the impedance-matching layer includes a pair of high dispersion and low dispersion layers, the low dispersion layer including $SiO_2$ or SiON and the high dispersion layer including TiO2 or $Si_3N_4$.

30. The IMOD of claim 27, wherein the absorber layer is formed of vanadium, germanium or osmium.

31. The IMOD of claim 27, further comprising:
a first protrusion connected to the movable reflector stack or to the absorber stack, wherein the first protrusion has a first height and is configured to cause the movable reflector stack to be tilted relative to the absorber layer when the movable reflector stack is moved close to the absorber stack.

32. The IMOD of claim 31, wherein the first protrusion is configured to cause color averaging when the moveable reflector stack is tilted.

33. The IMOD of claim 31, wherein the first protrusion is configured to cause color averaging when the IMOD is in a white state.

34. The IMOD of claim 31, wherein the first protrusion is connected to a surface of the movable reflector stack facing the absorber layer.

35. The IMOD of claim 31, wherein the first protrusion is configured to cause the movable reflector stack to be tilted by less than one degree relative to the absorber stack when the movable reflector stack is moved close to the absorber stack.

* * * * *